(12) United States Patent
McAllister et al.

(10) Patent No.: US 12,311,709 B2
(45) Date of Patent: May 27, 2025

(54) WEIGHT MEASURING HITCH BALL ASSEMBLY FOR MEASURING WEIGHT OF A TRAILER SUPPORTED BY A TOW VEHICLE

(71) Applicant: Weigh Safe, LLC, Lindon, UT (US)

(72) Inventors: Morgan McAllister, Lindon, UT (US); Emmanuel Karlsson, Orem, UT (US)

(73) Assignee: Weigh Safe, LLC, Lindon, UT (US)

( * ) Notice: Subject to any disclaimer, the term of this patent is extended or adjusted under 35 U.S.C. 154(b) by 293 days.

(21) Appl. No.: 17/583,021

(22) Filed: Jan. 24, 2022

(65) Prior Publication Data
US 2022/0250424 A1  Aug. 11, 2022

Related U.S. Application Data

(60) Provisional application No. 63/140,734, filed on Jan. 22, 2021.

(51) Int. Cl.
*B60D 1/24* (2006.01)
*B60D 1/06* (2006.01)
(Continued)

(52) U.S. Cl.
CPC ............... *B60D 1/248* (2013.01); *B60D 1/06* (2013.01); *B60D 1/363* (2013.01); *G01G 19/12* (2013.01)

(58) Field of Classification Search
CPC .......... B60D 1/248; B60D 1/06; B60D 1/363; B60D 1/62; G01G 19/12; G01G 19/08
(Continued)

(56) References Cited

U.S. PATENT DOCUMENTS

| | | |
|---|---|---|
| 245,201 A | 8/1881 | Mills |
| 665,017 A | 1/1901 | Klein |

(Continued)

FOREIGN PATENT DOCUMENTS

| | | |
|---|---|---|
| DE | 3612053 A1 | 10/1987 |
| DE | 10211572 A1 | 10/2003 |

(Continued)

OTHER PUBLICATIONS

PCT Search Report for application No. PCT/US15/19071, mailing date Jun. 24, 2015, 11 pages.
(Continued)

*Primary Examiner* — Jacques M Saint Surin
(74) *Attorney, Agent, or Firm* — Thorpe North & Western, LLP; David W. Osborne

(57) ABSTRACT

A weight measuring hitch ball assembly is described. The assembly can include a hitch ball and a body portion having an opening that slidably receives a lower portion of the hitch ball. Additionally, the assembly can include a retention coupling operable with the hitch ball and the body portion to secure the hitch ball to the body portion. The retention coupling can have a retention protrusion and a retention wall defining at least a portion of a retention opening operable to receive at least a portion of the retention protrusion therein. With the retention protrusion extending into the retention opening, the retention wall can provide a mechanical barrier to the retention protrusion that prevents removal of the hitch ball from the hitch ball opening, while allowing slidable movement of the hitch ball within the hitch ball opening sufficient to determine a magnitude of the force acting on the hitch ball.

22 Claims, 16 Drawing Sheets

(51) Int. Cl.
*B60D 1/36* (2006.01)
*G01G 19/12* (2006.01)
(58) Field of Classification Search
USPC .......................................................... 177/136
See application file for complete search history.

(56) References Cited

U.S. PATENT DOCUMENTS

| | | |
|---|---|---|
| 2,363,307 A | 11/1944 | Florschutz. |
| 2,500,686 A | 3/1950 | Jontz |
| 3,695,213 A | 10/1972 | Littlefield |
| 3,700,053 A | 10/1972 | Glissendorf |
| 3,797,594 A | 3/1974 | Chaffee |
| 4,056,155 A | 11/1977 | Wahl |
| 4,239,253 A | 12/1980 | Golze |
| 4,286,669 A | 9/1981 | Lasoen |
| 4,319,766 A | 3/1982 | Corteg et al. |
| 4,522,421 A | 6/1985 | Vance |
| 4,627,633 A | 12/1986 | Gehman et al. |
| 4,996,770 A | 3/1991 | McCracken |
| 5,040,817 A | 8/1991 | Dunn |
| 5,116,072 A | 5/1992 | Swenson |
| 5,280,941 A | 1/1994 | Guhlin |
| 5,286,094 A | 2/1994 | Milner |
| 5,290,057 A | 3/1994 | Pellerito |
| 5,890,726 A | 4/1999 | McCoy et al. |
| 6,053,521 A * | 4/2000 | Schertler ............... B60D 1/248 280/422 |
| 6,142,500 A * | 11/2000 | Sargent .................. B60D 1/075 280/483 |
| 6,253,626 B1 | 7/2001 | Shoberg et al. |
| 6,270,107 B1 | 8/2001 | Stoughton |
| 6,386,789 B1 | 5/2002 | Chausse et al. |
| 6,494,478 B1 * | 12/2002 | MacKarvich ............ B60D 1/06 280/483 |
| 6,629,701 B1 | 10/2003 | Colibert |
| 6,722,684 B1 | 4/2004 | McAllister |
| 6,829,943 B2 | 12/2004 | Weyand et al. |
| 7,960,659 B2 | 6/2011 | Cleary |
| 7,963,545 B2 | 6/2011 | Coy |
| 8,011,685 B2 | 9/2011 | Belinky et al. |
| 8,033,563 B2 | 10/2011 | Good |
| 8,226,107 B2 | 7/2012 | Columbia |
| 8,276,932 B2 | 10/2012 | Columbia |
| 8,371,603 B2 | 2/2013 | Columbia |
| 8,376,387 B2 | 2/2013 | Columbia |
| 8,380,390 B2 | 2/2013 | Sy et al. |
| 8,534,695 B2 | 9/2013 | Columbia |
| 8,840,130 B2 | 9/2014 | Columbia |
| 8,939,462 B2 | 1/2015 | Adamczyk et al. |
| 9,004,523 B2 | 4/2015 | Scharf |
| 9,327,566 B2 * | 5/2016 | McAllister ............... B60D 1/62 |
| 9,370,976 B2 | 6/2016 | McCoy et al. |
| 9,464,953 B2 * | 10/2016 | Wirthlin ................. G01L 5/136 |
| 9,643,462 B2 * | 5/2017 | McAllister ............ B60D 1/248 |
| 9,796,227 B2 | 10/2017 | McAllister |
| 10,059,160 B2 * | 8/2018 | Ruiz ...................... B60D 1/065 |
| 2001/0045725 A1 | 11/2001 | McCoy et al. |
| 2002/0140207 A1 | 10/2002 | McCoy et al. |
| 2005/0283296 A1 | 12/2005 | Viaud |
| 2006/0032679 A1 * | 2/2006 | Wilson ................... G01G 19/02 177/136 |
| 2006/0290102 A1 | 12/2006 | VanBuskirk |
| 2009/0107735 A1 | 4/2009 | Cleary |
| 2009/0302574 A1 | 12/2009 | Columbia |
| 2010/0181143 A1 | 7/2010 | Bowden |
| 2010/0207360 A1 | 8/2010 | Columbia |
| 2010/0332049 A1 | 12/2010 | Sy et al. |
| 2011/0042154 A1 | 2/2011 | Bartel |
| 2011/0259651 A1 | 10/2011 | Cleary |
| 2012/0024081 A1 | 2/2012 | Baker |
| 2012/0091690 A1 | 4/2012 | Tambornino |
| 2012/0217726 A1 | 8/2012 | Vortmeyer et al. |
| 2013/0038436 A1 | 2/2013 | Brey et al. |
| 2013/0080078 A1 | 3/2013 | Wirthlin |
| 2013/0127137 A1 | 5/2013 | McCoy et al. |
| 2013/0253814 A1 | 9/2013 | Wirthlin |
| 2014/0110918 A1 | 4/2014 | McCoy |
| 2014/0327229 A1 | 11/2014 | Scharf |
| 2014/0339791 A1 | 11/2014 | McCall et al. |
| 2015/0069737 A1 | 3/2015 | McAllister |
| 2016/0231165 A1 | 8/2016 | Fredrickson |
| 2020/0317011 A1 * | 10/2020 | McAllister ............ B60D 1/248 |
| 2020/0384817 A1 | 12/2020 | Anderson et al. |
| 2021/0170818 A1 * | 6/2021 | Doman .................... B60D 1/06 |
| 2021/0170819 A1 * | 6/2021 | Doman ................... G01L 5/136 |
| 2022/0363096 A1 * | 11/2022 | Doman ................... B60D 1/065 |

FOREIGN PATENT DOCUMENTS

| | | |
|---|---|---|
| DE | 202011051374 U1 | 9/2011 |
| DE | 202011105552 U1 | 9/2012 |
| DE | 102011078329 A1 | 1/2013 |
| EP | 2363307 A2 | 9/2011 |
| WO | WO 2007/002278 A2 | 1/2007 |
| WO | WO 2017/136483 A2 | 8/2017 |

OTHER PUBLICATIONS

PCT Search Report for application No. PCT/US22/13566, mailing date May 6, 2022, 10 pages.

* cited by examiner

WEIGHT MEASURING HITCH BALL ASSEMBLY FOR MEASURING WEIGHT OF A TRAILER SUPPORTED BY A TOW VEHICLE

RELATED APPLICATION

This application claims the benefit of U.S. Provisional Application No. 63/140,734, filed Jan. 22, 2021, which is incorporated herein by reference.

FIELD OF THE INVENTION

The present invention relates generally to trailer hitch devices, systems, and associated methods. Accordingly, the present invention involves the mechanical arts field.

BACKGROUND OF THE INVENTION

When towing a trailer behind a vehicle, one factor that can significantly affect safety is the hitch or tongue weight (i.e., static downward force) that the trailer applies to the hitch of the tow vehicle. If the hitch or tongue of the trailer does not apply enough downward force to the tow vehicle hitch, a dangerous condition called trailer sway could result. If the hitch or tongue of the trailer applies too much downward force to the tow vehicle hitch, then the rear tires of the tow vehicle can be overloaded, thus pushing the rear of the vehicle around and compromising steering and/or braking of the tow vehicle. A generally acceptable tongue weight for a "bumper pull" trailer is somewhere between 9% and 15% of the gross trailer weight (GTW).

SUMMARY OF THE INVENTION

Weight measuring hitch ball assemblies are provided. In one embodiment, a weight measuring hitch ball assembly can include a hitch ball having a ball and a lower portion. The assembly can also include a body portion defining a hitch ball opening that slidably receives the lower portion of the hitch ball. The assembly can further include a load measurement device operably associated with the body portion and the hitch ball to determine a magnitude of a force acting on the hitch ball. Additionally, the assembly can include a retention coupling operable with the hitch ball and the body portion to secure the hitch ball to the body portion. The retention coupling can have a retention protrusion and a retention wall defining at least a portion of a retention opening operable to receive at least a portion of the retention protrusion therein. The retention opening can extend about an outer periphery of the lower portion of the hitch ball. With the retention protrusion extending into the retention opening, the retention wall can provide a mechanical barrier to the retention protrusion that prevents removal of the hitch ball from the hitch ball opening. The retention opening can be configured to facilitate slidable movement of the hitch ball within the hitch ball opening sufficient to determine the magnitude of the force acting on the hitch ball.

In other embodiments, there are provided weight measuring hitch ball systems. In still other embodiments, there are provided methods of measuring weight of a trailer supported by a tow vehicle.

DETAILED DESCRIPTION OF THE INVENTION

Definitions

Figure 1:
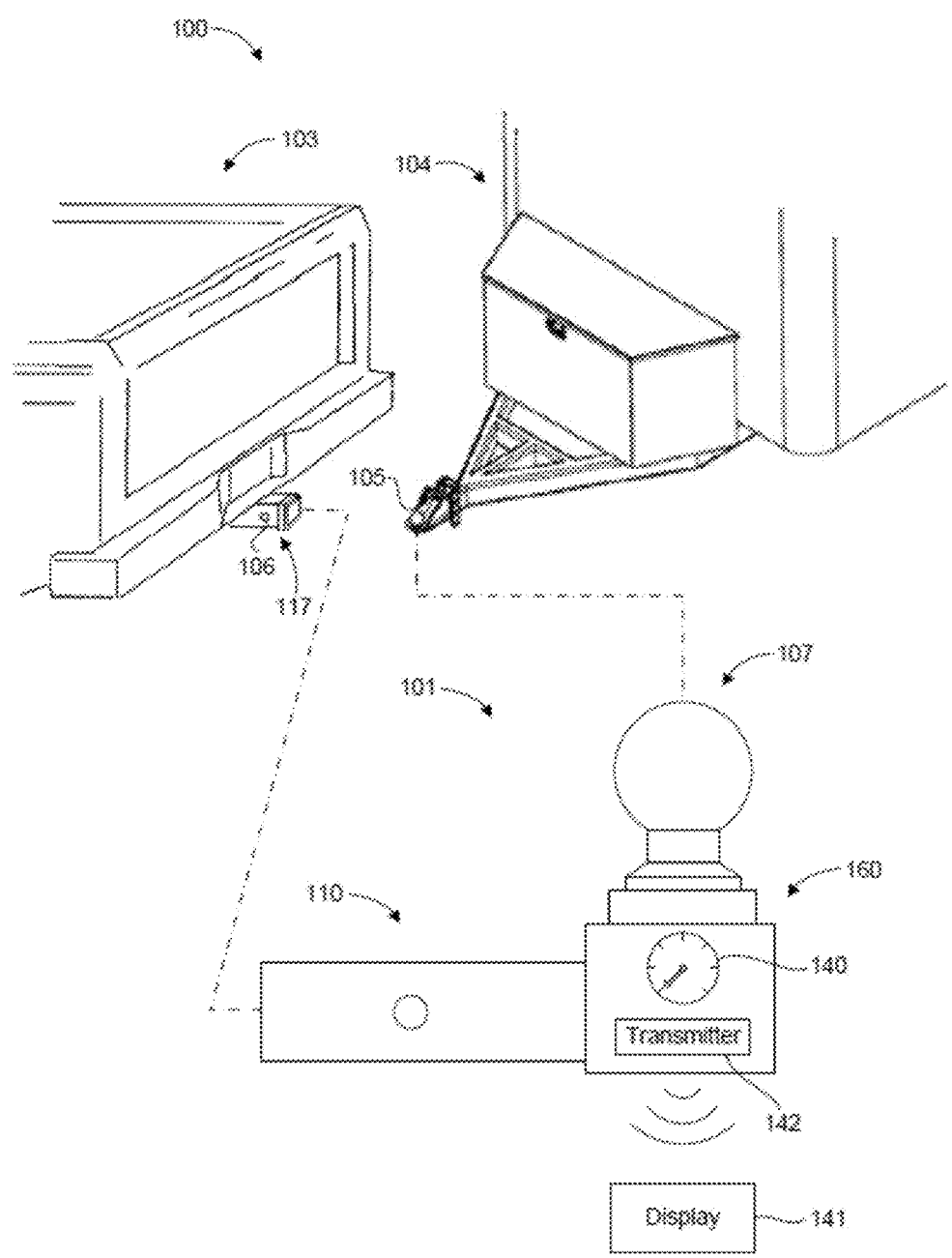
FIG. 1 illustrates a trailer hitch system for measuring tongue weight of a trailer, in accordance with an example of the present disclosure.

In describing and claiming the present invention, the following terminology will be used in accordance with the definitions set forth below.

The singular forms "a," "an," and, "the" include plural referents unless the context clearly dictates otherwise.

As used herein, the term "about" is used to provide flexibility to a numerical range endpoint by providing that a given value may be "a little above" or "a little below" the endpoint.

In this disclosure, "comprises," "comprising," "containing" and "having" and the like can have the meaning ascribed to them in U.S. patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. patent law. "Consisting essentially of" or "consists essentially of" have the meaning generally ascribed to them by U.S. patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," in the written description, it is understood that direct support should also be afforded to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects or structures described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "sufficient" refers to an adequate amount of space or clearance provided by a retention coupling that allows vertical movement of a hitch ball to determine downward force applied to the hitch ball. As a non-limiting example, an upper clearance between a retention protrusion and a retention wall can be sized equal to or greater than a range of motion of a load measurement device in response to a maximum allowable force applied to the hitch ball, ensuring that the retention protrusion will not hinder downward movement of the hitch ball.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

The Invention

Figure 2:
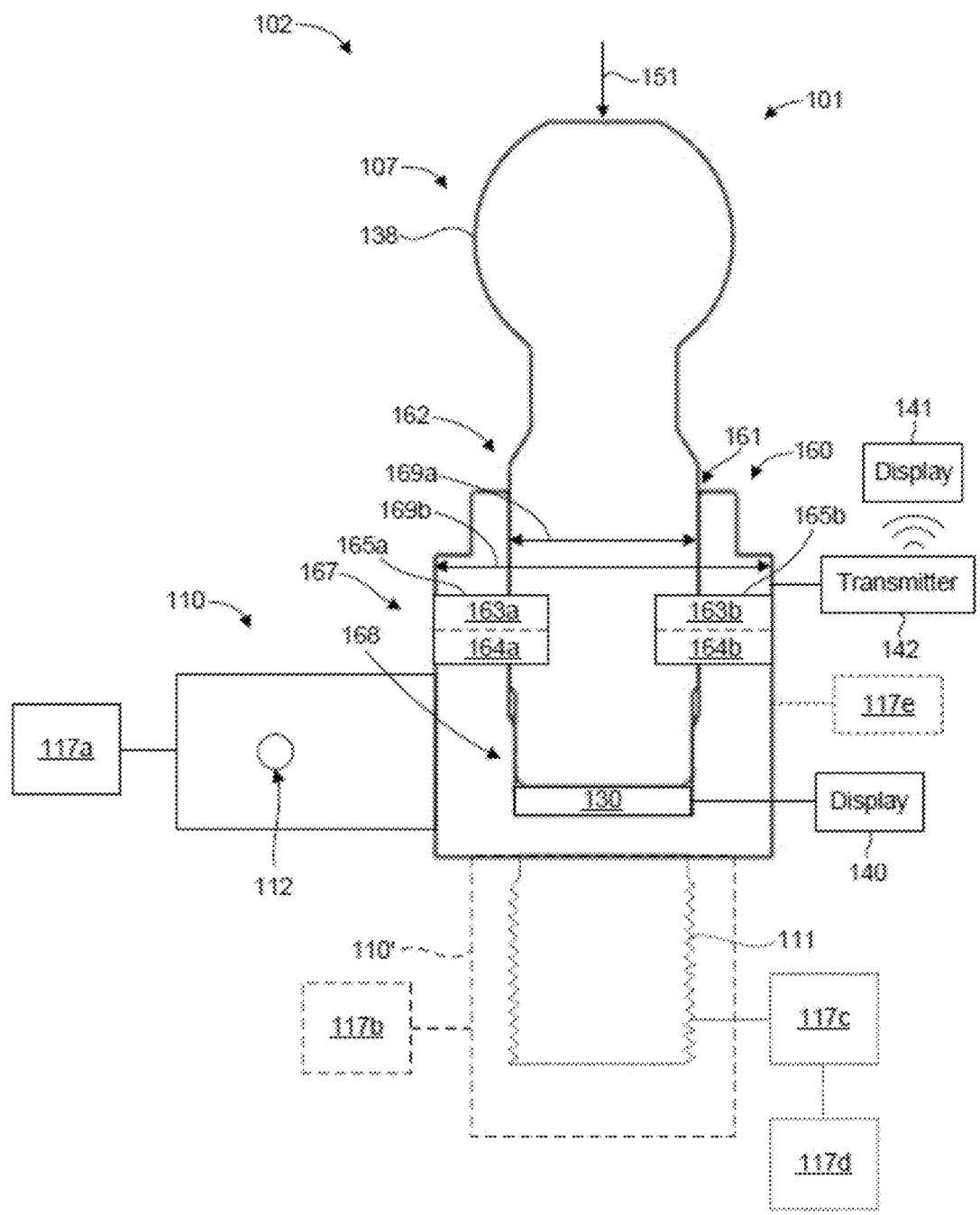
FIG. 2 is a schematic side cross-section view of a weight measuring hitch ball assembly of the trailer hitch system of FIG. 1, in accordance with an example of the present disclosure.

With reference to FIG. 1, illustrated is a trailer hitch system 100 for measuring hitch weight (e.g., ball weight, pin weight, or tongue weight) of a trailer, in accordance with an example of the present disclosure. In general, the trailer hitch system 100 can include a weight measuring hitch ball assembly 101 (or any other weight measuring hitch ball assembly disclosed herein) associated with a tow vehicle 103, and a trailer 104 operable to couple to the tow vehicle 103. A schematic illustration of the weight measuring hitch ball assembly 101 is shown in FIG. 2.

The weight measuring hitch ball assembly 101 can be included in a weight measuring hitch ball system 102, which can also include an attachment structure 117 operable to be associated with the tow vehicle 103 (FIG. 1) to facilitate coupling the weight measuring hitch ball assembly 101 to the tow vehicle 103. The attachment structure 117 is discussed in more detail below. The weight measuring hitch ball assembly 101 can include a hitch ball 107 (e.g., a ball mount) configured to engage with a coupling device 105 (FIG. 1) of the trailer 104 (e.g., a tongue), and a load measurement device 130 (FIG. 2) operable to determine a magnitude of a downward force 151 acting on the hitch ball 107.

Although the trailer hitch system 100 includes what is generally referred to as a "hitch ball" throughout the present disclosure for coupling with a trailer, it should be recognized that the trailer hitch system can include any suitable form of coupling with a trailer, such as a lunette ring and pintle hook. Aspects of the present disclosure that facilitate measuring hitch weight of a trailer as disclosed herein can be incorporated into such coupling arrangements.

The weight measuring hitch ball assembly 101 can also include a support structure or body portion 160. The hitch ball 107 can include a ball 138 and a lower portion 162. The ball 138 can be configured to interface with the coupling device 105 of a trailer (e.g., a trailer tongue). The ball 138 and the lower portion 162 can be separate and distinct structures coupled to one another (i.e., rigidly and fixedly coupled) or the ball 138 and the lower portion 162 can form a single, monolithic structure. In either case, the hitch ball 107 can be a single structure comprised of multiple component parts or portions that remain in a fixed relationship to one another.

The load measurement device 130 can be operably associated with the body portion 160 and the hitch ball 107 to determine a magnitude of the force 151 acting on the hitch ball 107 (e.g., through the trailer interface with the ball 138). For example, the body portion 160 can include or define a hitch ball opening or socket 161 to slidably receive the lower portion 162 of the hitch ball 107. The hitch ball opening 161 can be configured to constrain translational movement of the hitch ball 107 to a single degree of freedom (i.e., parallel to the downward force 151), which can facilitate the hitch ball 107 exerting a force on the load measurement device 130.

The load measurement device 130 can comprise any suitable type of load measurement device or mechanism described herein. For example, the load measurement device 130 can comprise a load cell or transducer, such as a strain gage load cell, a mechanical load cell, a hydraulic load cell, and/or a pneumatic load cell, or any other suitable type of force and/or pressure sensor. In some examples, the load measurement device 130 can comprise a force gauge, such as a spring scale. In some embodiments, the load measurement device 130 can include a piston, a hydraulic medium (e.g., a fluid), and a pressure sensor or a load gauge as described in several examples hereinabove and hereinbelow. For instance, as described in other examples disclosed herein, the load measurement device 130 can include a fluid reservoir in fluid communication with a load gauge, and the fluid reservoir can comprise at least one of a hydraulic fluid or a pneumatic fluid. In one aspect, the lower portion of the hitch ball can act against a separate piston, which in turn acts on the fluid in the fluid reservoir as a means to determine the downward force 151 acting on the hitch ball. In another aspect, a bottom 168 of the lower portion 162 of the hitch ball 107 can form a piston operable to act on fluid in the fluid reservoir. In this case, the hitch ball may act directly on the fluid in the fluid reservoir, with no intermediate structures between the hitch ball and the fluid. Thus, the hitch ball 107 may be configured with an integrally formed piston to act on the fluid. In one aspect, the body portion 160 can define various features of the load measurement device 130 in addition to interfacing with and supporting the hitch ball 107. For example, the body portion 160 can form or define, at least in part, a fluid reservoir of the load measurement device 130.

In addition, the weight measuring hitch ball assembly 101 can include a display 140 for displaying or otherwise indicating force or load information obtained by the load measurement device 130. For example, the display 140 can be configured to indicate the magnitude of the downward force, as determined by the load measurement device 130. Thus, the display 140 can be an analog and/or digital display of a sensor or load cell (e.g., a pressure gauge) located local to the load measurement device 130 and/or a separate display device distinct from the load measurement device 130 (e.g., a remote display associated with the tow vehicle and/or a mobile electronic device). The display 140 can be wired and/or wirelessly connected to the load measurement device 130. Thus, in one example, the weight measuring hitch ball assembly 101 can include a wireless transmitter 142, as described herein, to wirelessly transmit force measurements to a remote display 141.

In one aspect, the display 140 can be associated with the body portion 160, as shown in FIG. 2. The display 140 can be any suitable type of display, such as an analog or a digital display. The display 140 can be coupled to the load measurement device 130 in any suitable manner such that the display can properly indicate the magnitude of the load on the hitch ball 107. In one aspect, the display can be mechanically, electrically, hydraulically, and/or pneumatically coupled to the load measurement device 130. The load measurement device 130 and/or the display 140 can therefore include any suitable mechanical, electrical, hydraulic, and/or pneumatic device or mechanism that can facilitate the determination and/or display of the magnitude of the load on the hitch ball 107. For example, the load measurement device 130 and/or the display 140 can include a processor and memory to determine the magnitude of the load on the hitch ball 107. In one aspect, a mobile device, such as a smartphone or a tablet, can include a processor and memory used to determine the magnitude of the load on the hitch ball 107, such as by executing an application. In another aspect, the display 140 can be calibrated to indicate the magnitude of the load on the hitch ball 107, based on mechanical, electrical, hydraulic, and/or pneumatic input from the load measurement device 130. In a particular aspect, therefore, the display 140 can be integral with the load measurement device 130 in determining the magnitude of the load on the hitch ball 107.

In some examples, the weight measuring hitch ball assembly 101 can include a transmitter 142 such that load data pertaining to the magnitude of the downward force on the hitch ball 107 can be wired or wirelessly transmitted to the display 140. In one aspect, the transmitter can transmit load data to a location remote from the ball hitch, such as to a remote display 141. For example, the display 141 can be located inside the vehicle and can receive load data for display to the driver or operator of the vehicle. The transmission of load data can be via vehicle wiring, such as the taillight wiring, which can be utilized to communicate load data via a signal to the interior of the vehicle. In another aspect, a wireless transmission of load data can be accomplished via a BLUETOOTH connection, a cellular network, LAN, WIFI, an RF signal, an infrared signal, or any other suitable type of wireless network, connection, and/or protocol. In one aspect, the display 141 can comprise a screen of a mobile device, such as a smartphone or a tablet. Thus, the load data can be communicated to any suitable location, in or out of the vehicle. It should therefore be recognized that the display 140, 141 can be disposed in any suitable location and can be in communication with the load measurement device 130 via any suitable means. In one aspect, the load measurement device 130, the display 140, and/or the transmitter 150, or any other related item or device, such as a processor, memory, a battery, or a RF receiver, can be located in or on the weight measuring hitch ball assembly 101.

In one aspect, the weight measuring hitch ball assembly 101 of FIG. 2 can be configured to capture the hitch ball 107 to prevent the hitch ball from unwanted separation from the body portion 160. For example, the assembly 101 can include a retention coupling 167 operable with the hitch ball 107 and the body portion 160 to secure the hitch ball 107 to the body portion 160 while also facilitating slidable movement of the hitch ball 107 within the hitch ball opening 161 sufficient to determine the magnitude of the force 151 acting on the hitch ball 107. The retention coupling 167 can have a retention protrusion 164*a-b* and a retention wall 165*a-b* defining at least a portion of a retention opening 163*a-b* operable to receive at least a portion of the retention protrusion 164*a-b* therein. The retention wall 165*a-b*, the retention opening 163*a-b*, and the retention protrusion 164*a-b* are schematically represented in FIG. 2. The retention opening 163*a-b* can be associated with the hitch ball 107 (e.g., formed within the lower portion 162 of the hitch ball 107) and/or associated with the body portion 160 (e.g., formed within the body portion 160). The retention protrusion 164*a-b* can also be associated with the hitch ball 107 (e.g., coupled to the lower portion 162 of the hitch ball 107) and/or associated with the body portion 160 (e.g., coupled to the body portion 160). In one example, the retention protrusion 164*a-b* can be fastened, affixed, or otherwise associated with the hitch ball 107 (e.g., the lower portion 162) and the retention opening 163*a-b* can be formed in the body portion 160 (e.g., a through-hole in a sidewall of the body portion 160). With the retention protrusion 164*a-b* extending into the retention opening 163*a-b*, the retention wall 165*a-b* can provide a mechanical barrier to the retention protrusion 164*a-b* that prevents removal of the hitch ball 107 from the hitch ball opening 161. The retention wall 165*a-b* can be of any suitable shape, geometry, or configuration to provide or define a suitable retention opening 163*a-b*. In some examples, one or more of the retention openings 163*a-b* can be configured as a recess, a through opening (e.g., a through-hole), a blind opening (e.g., a blind-hole), etc. Similarly, one or more of the retention protrusions 164*a-b* can be of any suitable shape, geometry, or configuration to facilitate extension into at least a portion of a retention opening as disclosed herein.

In one example, each of the retention openings 163*a-b* can receive at least one of the retention protrusions 164*a-b* to secure the hitch ball 107 to the body portion 160. For example, the retention protrusions 164*a-b* can extend into the respective retention openings 163*a-b*. The retention openings 163*a-b* and the retention protrusions 164*a-b* can be configured to facilitate movement of the hitch ball 107 against the load measurement device 130 in response to the downward force 151 on the hitch ball. For example, an upper clearance between the retention protrusions 164*a-b* and retention walls 165*a-b* of the retention openings 163*a-b* can be sized equal to or greater than a range of motion of the load measurement device 130 (e.g., maximum deflection or piston travel) in response to a maximum allowable force 151 applied to the hitch ball 107. This can ensure that the retention protrusions 164*a-b* will not hinder downward movement of the hitch ball 107, which could interfere with a proper measurement of the downward force 151 on the hitch ball 107. The shapes and/or sizes of the retention protrusions 164*a-b* and the retention openings 163*a-b* can be of any suitable configuration (e.g., cross-sectional shapes that are circular, oval, elliptical, rectangular, etc.), structure (e.g., a notch, groove, channel, hole, etc.), or dimension. For example, the retention protrusions 164*a-b* can comprise at least one of a pin, a bolt, a screw, a rod, a shaft, a stud, a shoulder bolt, a tab, a flange, or a ball. In addition, the retention openings 163*a-b* and the retention protrusions 164*a-b* can be included in any suitable quantity and in any suitable location or pattern.

In one aspect, one or more of the retention protrusions 164*a-b* can extend into one or more of the retention openings 163*a-b* and one or more ends of the retention protrusions 164*a-b* can terminate within one or more of the retention openings 163*a-b* (e.g., within the lower portion 162 of the hitch ball 107 or within the body portion 160). In other words, the retention protrusions 164*a-b* do not extend all the way through the hitch ball 107 (e.g., through the lower portion 162) or the body portion 160, as applicable. In a particular aspect, one or more of the retention openings 163*a-b* can be blind openings or holes (e.g., openings or holes that do not extend all the way through the lower portion 162 of the hitch ball 107 or the body portion 160). Thus, one or more of the retention openings 163*a-b* can be blind openings or through openings and the retention protrusions 164*a-b* may not extend all the way through the hitch ball 107 or body portion 160.

In one aspect, the lower portion 162 of the hitch ball 107 and the body portion 160 can have a dimensional relationship that results in a relatively "thin-walled" body portion 160 forming the hitch ball opening 161 and surrounding the lower portion 162 of the hitch ball 107. Thus, in some examples, an outer dimension 169*a* of the lower portion 162 of the hitch ball 107 can be greater than or equal to 50% of an outer dimension 169*b* of the body portion 160 about the lower portion 162 of the hitch ball 107.

The weight measuring hitch ball assembly 101 can be adapted to serve as a hitch ball or ball mount for a variety of different hitch configurations. Variations of the attachment structure 117 are illustrated as attachment structures 117a-e in FIG. 2. For example, the attachment structure 117a can be any typical horizontally-oriented hitch receiver, such as a standard 2½", 2", or 1¼" size square hitch receiver for receiving hitch components (e.g., drawbars) for "bumper pull" style hitches. In other examples, an attachment structure 117b can be any typical vertically-oriented hitch receiver, such as a square hitch receiver (typically aftermarket) or a round hitch receiver (typically OEM) for receiving bed-mount style hitches (e.g., gooseneck hitches). In one example, the weight measuring hitch ball assembly 101 can include a coupling feature 111 operable to couple the hitch ball assembly 101 to an attachment structure 117c (e.g., a draw bar) that facilitates coupling the assembly 101 to the tow vehicle 103. In this case, the attachment structure 117c can be configured to interface with an attachment structure 117d (e.g., a hitch receiver) attached to a tow vehicle. In another example, the attachment structure 117e can be a hitch or hitch portion (e.g., an above-bed attachment structure, such as an above-bed gooseneck hitch system) that attaches to a tow vehicle. In one aspect, the attachment structures 117a-e can be a portion of the tow vehicle 103, such that the assembly 101 is coupled directly to the tow vehicle 103. The coupling feature 111 can be or include any suitable coupling configuration known in the art, such as a threaded coupling feature (e.g., external threads or internal threads), a shaft, a rod, a hole, a recess, a groove, a pin, or any other feature suitable for coupling the assembly 101 to an attachment structure and/or a tow vehicle and maintaining structural integrity during towing. In one aspect, the coupling feature 111 can extend downward from the body portion 160 below the hitch ball 107, although any other suitable location and/or orientation of the coupling feature 111 is contemplated.

One benefit of the coupling feature 111 is that it enables the weight measuring hitch ball assembly 101 to be removably coupled to a given attachment structure 117a-e (e.g., a hitch or hitch portion, drawbar, hitch receiver, etc.) that is operable to facilitate coupling the assembly 101 to the tow vehicle 103. As will be apparent to one skilled in the art, coupling devices of trailers (e.g., goosenecks, trailer tongues, etc.) have a variety of sizes and can require differing hitch ball sizes to securely couple a trailer to a towing vehicle. Some standard hitch ball sizes can include 50 mm, 1⅞", 2", 2 5/16", and 3" diameters. Thus, an assembly 101 having a suitable ball 138 size can be selected for coupling with a given attachment structure 117a-e (e.g., a hitch or hitch portion, drawbar, hitch receiver, etc.) to accommodate a given size/configuration of trailer coupling device.

In one example, the body portion 160 can be configured to interface directly with the attachment structure 117e associated with a tow vehicle that facilitates coupling the weight measuring hitch ball assembly 101 to the tow vehicle. In another example, the weight measuring hitch ball assembly 101 can include a hitch portion 110, 110' configured to interface with the attachment structure 117a, 117b, respectively, associated with a tow vehicle that facilitates coupling the weight measuring hitch ball assembly 101 to the tow vehicle. In one example, the hitch portion 110 extends laterally from the body portion 160 on a lateral side of the hitch ball 107. In this case, the attachment structure 117a can comprise a hitch receiver. The hitch portion 110 can include a hole 112 or other suitable feature to facilitate securing the weight measuring hitch ball assembly 101 to the attachment structure 117a, such as with a pin or threaded fastener through the hole 112 of the assembly 101 and a hole 106 of the attachment structure 117a. In another example, the hitch portion 110' can be configured to interface with the attachment structure 117b associated with a tow vehicle that facilitates coupling the weight measuring hitch ball assembly 101 to the tow vehicle. In this example, the hitch portion 110' extends downward from the body portion 160 below the hitch ball 107. In this case, the attachment structure 117b can comprise a goose ball receiver socket mounted on or otherwise associated with a tow vehicle. In the above examples, the hitch portions 110, 110' can be permanently attached (e.g., integrally formed) with the body portion 160 or removably coupled to the body portion 160.

A method of measuring weight of a trailer supported by a tow vehicle can comprise operably coupling a weight measuring hitch ball assembly as disclosed herein (e.g., the weight measuring hitch ball assembly 101) to a tow vehicle. The method can also include engaging a coupling device of a trailer with the weight measuring hitch ball assembly.

The weight measuring hitch ball assembly 101 of FIGS. 1 and 2 has been shown and described as a generic representation of such an assembly. FIGS. 3-9D include illustrations of various weight measuring hitch ball assemblies that are more specific examples of the generic assembly 101 of FIGS. 1 and 2. Thus, the description of the assembly 101 in FIGS. 1 and 2 may describe aspects of the various assemblies of FIGS. 3-9D, as applicable, which may not be described with particular reference to FIGS. 3-9D. Furthermore, certain specific aspects and features described in one example may be present in another example, although not specifically discussed with reference to that example.

Figure 3:
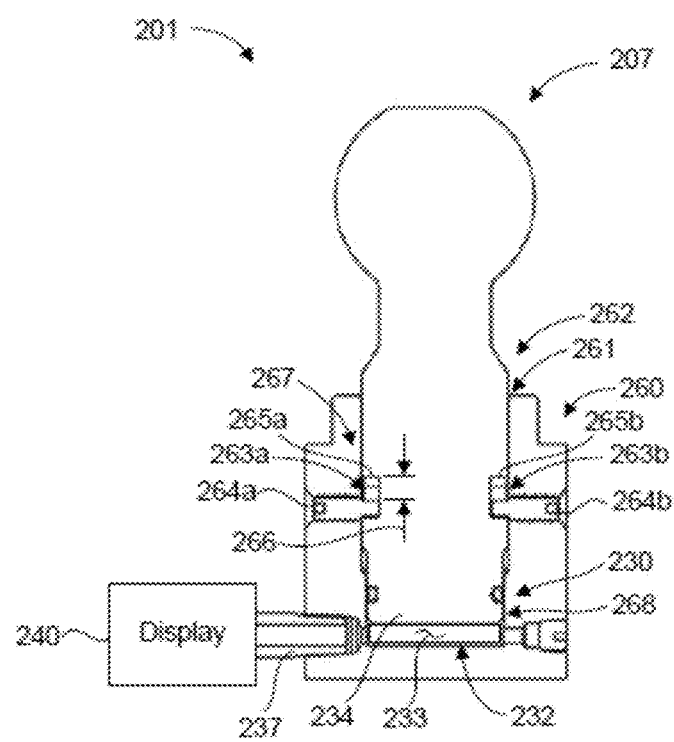
FIG. 3 is a schematic side cross-section view of a weight measuring hitch ball assembly in accordance with an example of the present disclosure.

FIG. 3 illustrates a weight measuring hitch ball assembly 201 in accordance with an example of the present disclosure. The weight measuring hitch ball assembly 201 can include a hitch ball 207 configured to engage with a coupling device of the trailer, a load measurement device 230 operable to determine a magnitude of a downward force 251 acting on the hitch ball 207, and a support structure or body portion 260 in support of the hitch ball 207. The body portion 260 can include or define a hitch ball opening or socket 261 to slidably receive a lower portion 262 of the hitch ball 207. The load measurement device 230 can comprise any suitable type of load measurement device or mechanism described herein.

In the illustrated example, the load measurement device 230 includes a reservoir 232 having a fluid 233 and a piston 234 disposed therein. In this case, the piston 234 is integrally formed with a hitch ball 207 (e.g., a bottom 268 of a lower end 262 of the hitch ball 207 forms the piston 234). The piston 234 can affect a pressure of the fluid 233 as a result of a downward force on the hitch ball 207. The load measurement device 230 also includes a pressure sensor 236, or gauge, in fluid communication with the reservoir 232, such as via a conduit 237, to indicate a quantity of the downward force acting on the hitch ball 207 based on the pressure of the fluid. The pressure sensor 236 can be calibrated to indicate the force acting on the hitch ball 207.

In one aspect, a display 240 for the pressure sensor or gauge can be included to indicate the magnitude of the load or downward force acting on the hitch ball 207. Such a display can be located proximate a pressure sensor or included with a gauge. It should be recognized that a pressure sensor, a gauge, or a display can be disposed in any suitable location. For example, as shown in FIG. 3, a pressure sensor and associated display 240 can be located at a distance from the body portion 260. In this case, the pressure sensor can be in fluid communication with the fluid reservoir via the conduit 237 external to the body portion 260. In one aspect, multiple pressure sensors and/or displays can be utilized to present force information in various directions and/or locations.

The assembly 201 can be configured to capture the hitch ball 207 to prevent the hitch ball from unwanted separation from the body portion 260. For example, as shown in FIG. 3, the assembly 201 can include a retention coupling 267 that secures the hitch ball 207 to the body portion 260 while also facilitating slidable movement of the hitch ball 207 within a hitch ball opening 261 of the body portion 260 to determine the magnitude of a force acting on the hitch ball 207. The retention coupling 267 can have a retention protrusion 264a-b and a retention wall 265a-b defining at least a portion of a retention opening 263a-b operable to receive at least a portion of the retention protrusion 264a-b therein. The retention wall 265a-b can provide a mechanical barrier to the retention protrusion 264a-b that prevents removal of the hitch ball 207 from the hitch ball opening 261.

In the illustrated example, one or more of the retention openings 263a-b is associated with the hitch ball 207 (e.g., formed within the lower portion 262 of the hitch ball 207). In addition, one or more of the retention protrusions 264a-b is associated with the body portion 260 (e.g., coupled to the body portion 260). As shown in the illustrated example, the retention protrusions 264a-b can be threadingly engaged with the body portion 260. That is, the retention protrusions 264a-b can contain external threads configured to engage the internal threads in the retention openings 263a-b in the body portion 260, or engage internal threads in the lower portion 262 of the hitch ball 207. Each of the retention openings 263a-b can receive at least one of the retention protrusions 264a-b to secure the hitch ball 207 to the body portion 260. For example, the retention protrusions 264a-b can extend into the respective retention openings 263a-b. The retention openings 263a-b and the retention protrusions 264a-b can be configured to facilitate movement of the hitch ball 207 against the load measurement device 230 in response to the downward force 251 on the hitch ball. For example, an upper clearance 266 between the retention protrusions 264a-b and the retention walls 265a-b of the retention openings 263a-b can be sized equal to or greater than a range of motion of the load measurement device 230 (e.g., maximum deflection or piston travel) in response to a maximum allowable force 251 applied to the hitch ball 207. This can ensure that the retention protrusions 264a-b will not hinder downward movement of the hitch ball 207, which could interfere with a proper measurement of the downward force 251 on the hitch ball 207. The shapes and/or sizes of the retention protrusions 264a-b and the retention openings 263a-b can be of any suitable configuration (e.g., cross-sectional shapes that are circular, oval, elliptical, rectangular, etc.), structure (e.g., a notch, groove, channel, hole, etc.), or dimension. For example, the retention protrusions 264a-b can comprise at least one of a pin, a bolt, a screw, a rod, a shaft, a tab, a flange, or a ball. In addition, the retention openings 263a-b and the retention protrusions 264a-b can be included in any suitable quantity and in any suitable location or pattern.

The retention protrusions 264a-b and retention openings 263a-b can have any suitable relationship with the associated hitch ball 207 and body portion 260. In one aspect, as shown in FIG. 3, one or more of the retention protrusions 264a-b (and/or retention openings 263a-b) can be oriented toward a center of the hitch ball 207. In another aspect, at least two retention protrusions 264a-b (and/or retention openings 263a-b) can be oriented parallel to one another. In a particular aspect, at least two of the retention protrusions 264a-b (and/or retention openings 263a-b) can be aligned with one another.

In one aspect, ends of the retention protrusions 264a-b can terminate within the retention openings 263a-b (e.g., within the lower portion 262 of the hitch ball 207). In other words, the retention protrusions 264a-b do not extend all the way through the hitch ball 207 (e.g., through the lower portion 262). In a particular aspect, one or more of the retention openings 263a-b can be blind openings or holes (e.g., openings or holes that do not extend all the way through the lower portion 262 of the hitch ball 207). Thus, one or more of the retention openings 263a-b can be blind openings or through openings and the retention protrusions 264a-b may not extend all the way through the hitch ball 207.

Although the retention openings 263a-b have been shown and described as being associated with the hitch ball 207 and the retention protrusions 264a-b have been shown and described as being associated with the body portion 260, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

Figure 4A:
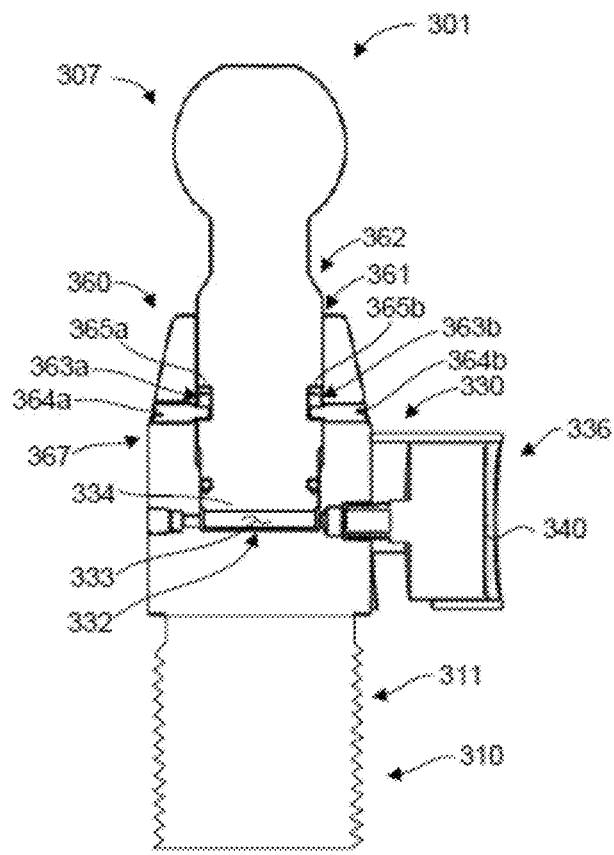
FIG. 4A is a schematic side cross-section view of a weight measuring hitch ball assembly in accordance with an example of the present disclosure.
Figure 4B:
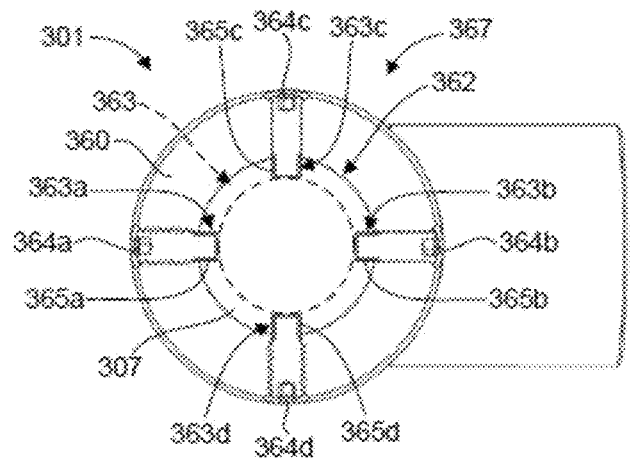
FIG. 4B is a schematic top cross-section view of the weight measuring hitch ball assembly of FIG. 4A, in accordance with an example of the present disclosure.

FIGS. 4A and 4B illustrate a weight measuring hitch ball assembly 301 in accordance with an example of the present disclosure. The weight measuring hitch ball assembly 301 can include a hitch ball 307 configured to engage with a coupling device of the trailer, a load measurement device 330 operable to determine a magnitude of a downward force acting on the hitch ball 307, and a support structure or body portion 360 in support of the hitch ball 307. The body portion 360 can include or define a hitch ball opening or socket 361 to slidably receive a lower portion 362 of the hitch ball 307.

The load measurement device 330 can comprise any suitable type of load measurement device or mechanism described herein. As with the assembly 201 of FIG. 3 discussed above, in this particular example, the assembly 301 of FIGS. 4A and 4B includes a load measurement device 330 with a reservoir 332 having a fluid 333 and a piston 334 integrated with a hitch ball 307 disposed in the reservoir 332, as shown in FIG. 4A. In this case, a pressure sensor 336, or gauge, and associated display 340 are located on, or mounted to, a body portion 360.

The assembly 301 also includes a hitch portion 310 configured to interface with an attachment structure associated with a tow vehicle that facilitates coupling the hitch ball assembly 301 to the tow vehicle. In this example, the hitch portion 310 extends downward from the body portion 360 below a hitch ball 307. In this case, the hitch portion 310 can include a coupling feature 311 operable to couple the hitch ball assembly 301 to an attachment structure, as described herein (e.g., a draw bar), which facilitates coupling the assembly 301 to a tow vehicle. The coupling feature 311 can be or include any suitable coupling configuration known in the art, such as a threaded coupling feature (e.g., external threads or internal threads), a shaft, a rod, a hole, a recess, a groove, a pin, or any other feature suitable for coupling the assembly 301 to an attachment structure and/or a tow vehicle and maintaining structural integrity during towing. Although the coupling feature 311 is illustrated as extending downward from the body portion 360 below the hitch ball 307, any other suitable location and/or orientation of the coupling feature 111 is contemplated.

The assembly 301 can be configured to capture the hitch ball 307 to prevent the hitch ball from unwanted separation from the body portion 360. For example, as shown in FIGS. 4A and 4B, the assembly 301 can include a retention coupling 367 that secures the hitch ball 307 to the body portion 360 while also facilitating slidable movement of the hitch ball 307 within a hitch ball opening 361 of the body portion 360 to determine the magnitude of a force acting on the hitch ball 307. The retention coupling 367 can have a retention protrusion 364a-d and a retention wall 365a-d defining at least a portion of a retention opening 363a-d operable to receive at least a portion of the retention protrusion 364a-d therein. The retention wall 365a-d can provide a mechanical barrier to the retention protrusion 364a-d that prevents removal of the hitch ball 307 from the hitch ball opening 361.

In the illustrated example, one or more of the retention openings 363a-d is associated with the hitch ball 307 (e.g., formed within the lower portion 362 of the hitch ball 307). In addition, one or more of the retention protrusions 364a-d is associated with the body portion 360 (e.g., coupled to the body portion 360). As shown in the illustrated example, the retention protrusions 364a-d can be threadingly engaged with the body portion. Each of the retention openings 363a-d can receive at least one of the retention protrusions 364a-d to secure the hitch ball 307 to the body portion 360. For example, the retention protrusions 364a-d can extend into the respective retention openings 363a-d. The retention openings 363a-d and the retention protrusions 364a-d can be configured to facilitate movement of the hitch ball 307 against the load measurement device 330 in response to the downward force on the hitch ball. For example, an upper clearance between the retention protrusions 364a-d and the retention walls 365a-d of the retention openings 363a-d can be sized equal to or greater than a range of motion of the load measurement device 330 (e.g., maximum deflection or piston travel) in response to a maximum allowable force applied to the hitch ball 307. This can ensure that the retention protrusions 364a-d will not hinder downward movement of the hitch ball 307, which could interfere with a proper measurement of the downward force on the hitch ball 307. The shapes and/or sizes of the retention protrusions 364a-d and the retention openings 363a-d can be of any suitable configuration (e.g., cross-sectional shapes that are circular, oval, elliptical, rectangular, etc.), structure (e.g., a notch, groove, channel, hole, etc.), or dimension. For example, the retention protrusions 364a-d can comprise at least one of a pin, a bolt, a screw, a rod, a shaft, a tab, a flange, or a ball. In addition, the retention openings 363a-d and the retention protrusions 364a-d can be included in any suitable quantity and in any suitable location or pattern.

The retention protrusions 364a-d and retention openings 363a-d can have any suitable relationship with the associated hitch ball 307 and body portion 360. The top cross-sectional view of FIG. 4B further illustrates an arrangement of retention openings 363a-d and the retention protrusions 364a-d that serve to secure the hitch ball 307 to the body portion 360. In this case, four retention protrusions 364a-d extend into four respective retention openings 363a-d, which are equally spaced about the circumference of the body portion 360 and the hitch ball 307, although any suitable configuration may be utilized. As further shown in the FIG. 4B example, one or more of the retention protrusions 364a-d (and/or retention openings 363a-d) can be oriented toward a center of the hitch ball 307. In one aspect, at least two retention protrusions 364a-b, 364c-d (and/or retention openings 363a-b, 363c-d) can be oriented parallel to one another. In a particular aspect, at least two of the retention protrusions 364a-b, 364c-d (and/or retention openings 363a-b, 363c-d) can be aligned with one another. In yet another aspect, at least two of the retention protrusions 364a-b can be oriented perpendicular relative to retention protrusions 364c-d (and/or retention openings 363a-b relative to retention openings 363c-d).

Figure 4C:
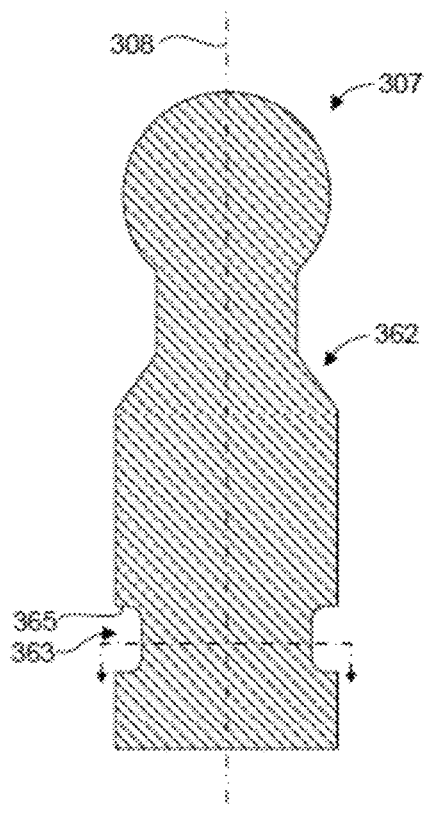
FIG. 4C is a side cross-sectional view of a hitch ball having a single retention opening, in accordance with an example of the present disclosure.
Figure 4D:
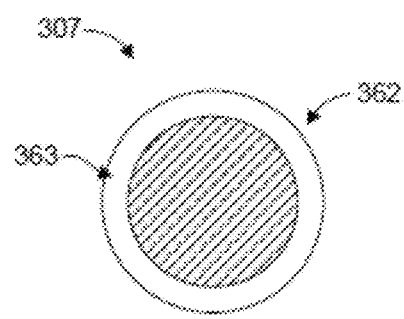
FIG. 4D is a top cross-sectional view of the hitch ball of FIG. 4C.
Figure 4E:
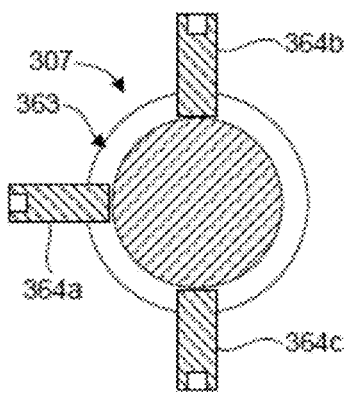
FIG. 4E is a top cross-sectional view of the hitch ball of FIG. 4C illustrating an arrangement of three retention protrusions in the retention opening, in accordance with an example of the present disclosure.
Figure 4F:
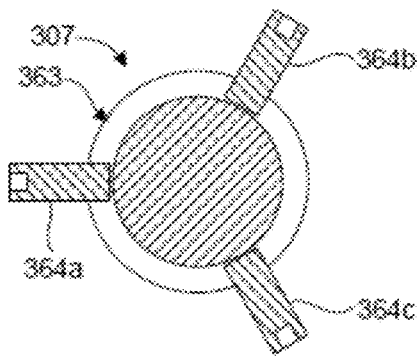
FIG. 4F is a top cross-sectional view of the hitch ball of FIG. 4C illustrating an arrangement of three retention protrusions in the retention opening, in accordance with another example of the present disclosure.
Figure 4G:
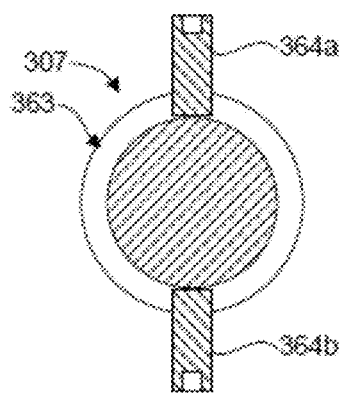
FIG. 4G is a top cross-sectional view of the hitch ball of FIG. 4C illustrating an arrangement of two retention protrusions in the retention opening, in accordance with an example of the present disclosure.
Figure 4H:
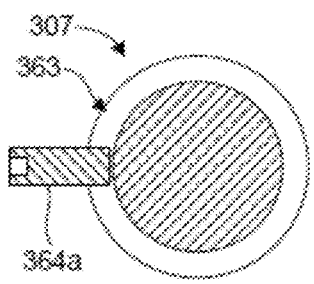
FIG. 4H is a top cross-sectional view of the hitch ball of FIG. 4C illustrating an arrangement of one retention protrusion in the retention opening, in accordance with an example of the present disclosure.

In one aspect, a retention opening 363 can extend (entirely) about an outer periphery of the lower portion 362 of the hitch ball 307, as illustrated in FIGS. 4B-4H. The retention opening 363 can be at least partially defined by a retention wall 365. In this case, one or more of the retention protrusions 364a-d can extend into the (single) retention opening 363. Such a configuration can enable relative rotation between the hitch ball 307 and the body portion 360 about a longitudinal or vertical axis 308 of the hitch ball 307 (FIG. 4C). Any suitable number of retention protrusions 364a-d can be utilized with the retention opening 363. Non-limiting examples include four retention protrusions 364a-d (FIG. 4B), three retention protrusions 364a-c (FIGS. 4E and 4F), two retention protrusions 364a-b (FIG. 4G), and one (i.e., a single) retention protrusion 364a (FIG. 4H) extending into the retention opening 363. The retention protrusions disclosed herein can be in any suitable relationship relative to one another about the lower portion 362, such as evenly or uniformly spaced from one another (FIGS. 4B, 4F, and 4G), or nonuniformly spaced from one another (FIG. 4E) about the lower portion 362. These principles regarding the number and relationship of the retention protrusions are applicable to hitch balls having only a single retention opening (e.g., the retention opening 363) or multiple retention openings (e.g., the retention openings 363a-d).

As with the multiple retention openings 363a-d discussed above, the single retention opening 363 and one or more retention protrusions 364a-d can be configured to facilitate movement of the hitch ball 307 against the load measurement device 330 in response to the downward force on the hitch ball (e.g., by providing an upper clearance between the one or more retention protrusions 364a-d and the retention wall 365 of the retention opening 363) and ensure that the one or more retention protrusions 364a-d will not hinder downward movement of the hitch ball 307. The shape and/or size of the retention opening 363 can be of any suitable configuration (e.g., cross-sectional shape that is circular, oval, elliptical, rectangular, etc.), structure (e.g., a notch, groove, channel, hole, etc.), or dimension.

In one aspect, ends of the retention protrusions 364a-d can terminate within the retention openings 363, 363a-d (e.g., within the lower portion 362 of the hitch ball 307). In other words, the retention protrusions 364a-d do not extend all the way through the hitch ball 307 (e.g., through the lower portion 362). In a particular aspect, one or more of the retention openings 363a-d can be blind openings or holes (e.g., openings or holes that do not extend all the way through the lower portion 362 of the hitch ball 307). Thus, one or more of the retention openings 363a-d can be blind openings or through openings and the retention protrusions 364a-d may not extend all the way through the hitch ball 307.

Although the retention openings 363, 363a-d have been shown and described as being associated with the hitch ball 307 and the retention protrusions 364a-d have been shown and described as being associated with the body portion 360, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

Figure 5A:
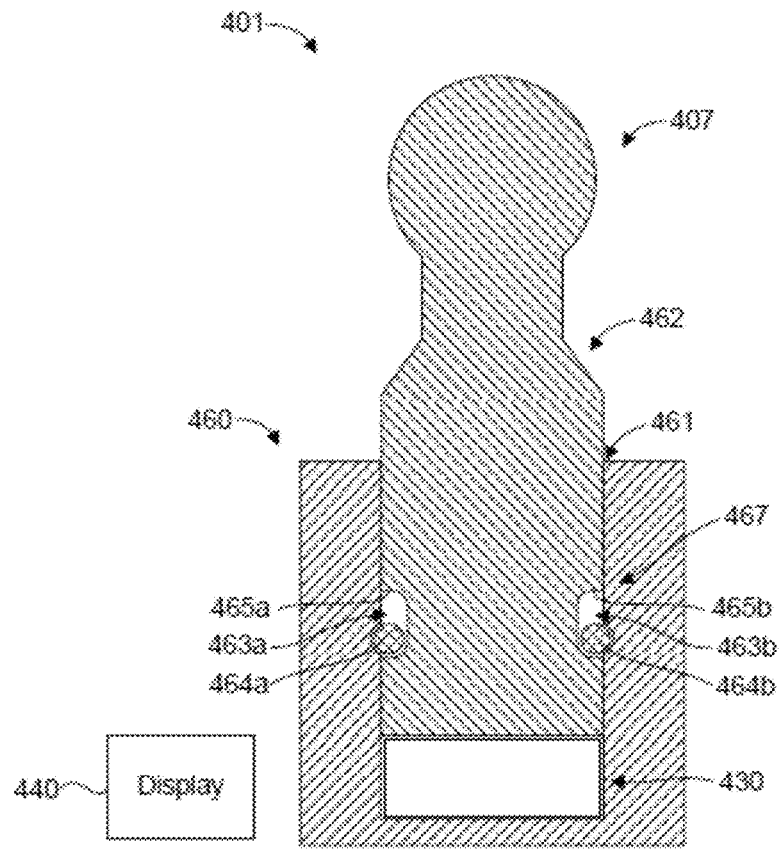
FIG. 5A is a schematic side cross-section view of a weight measuring hitch ball assembly in accordance with an example of the present disclosure.
Figure 5B:
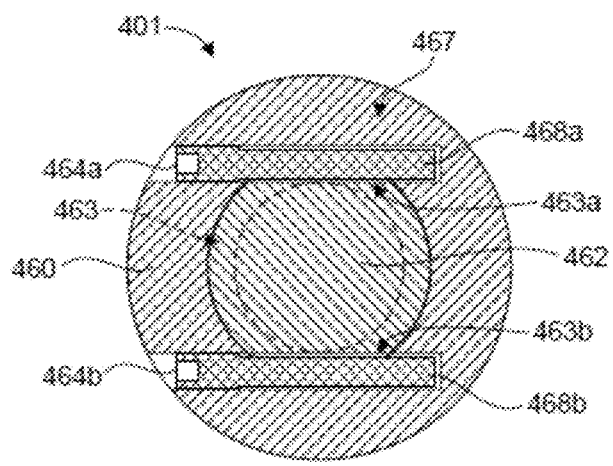
FIG. 5B is a schematic top cross-section view of the weight measuring hitch ball assembly of FIG. 5A, in accordance with an example of the present disclosure.

FIGS. 5A and 5B illustrate a weight measuring hitch ball assembly 401 in accordance with an example of the present disclosure. The weight measuring hitch ball assembly 401 can include a hitch ball 407 configured to engage with a coupling device of the trailer, a load measurement device 430 operable to determine a magnitude of a downward force acting on the hitch ball 407, and a support structure or body portion 460 in support of the hitch ball 407. The body portion 460 can include or define a hitch ball opening or socket 461 to slidably receive a lower portion 462 of the hitch ball 407. The load measurement device 430 can comprise any suitable type of load measurement device or mechanism described herein. In one aspect, a display 440 for the load measurement device 430 can be included to indicate the magnitude of the load or downward force acting on the hitch ball 407. The display 440 can be of any suitable type or configuration disclosed herein and can be disposed in any suitable location. The assembly 401 can be adapted to couple or interface with any suitable attachment structure, as disclosed herein, to facilitate coupling the weight measuring hitch ball assembly 401 to a tow vehicle.

The assembly 401 can be configured to capture the hitch ball 407 to prevent the hitch ball from unwanted separation from the body portion 460. For example, as shown in FIGS. 5A and 5B, the assembly 401 can include a retention coupling 467 that secures the hitch ball 407 to the body portion 460 while also facilitating slidable movement of the hitch ball 407 within a hitch ball opening 461 of the body portion 460 to determine the magnitude of a force acting on the hitch ball 407. The retention coupling 467 can have a retention protrusion 464a-b and a retention wall 465a-b defining at least a portion of a retention opening 463a-b operable to receive at least a portion of the retention protrusion 464a-b therein. The retention wall 465a-b can provide a mechanical barrier to the retention protrusion 464a-b that prevents removal of the hitch ball 407 from the hitch ball opening 461.

In the illustrated example, one or more of the retention openings 463a-b is associated with the hitch ball 407 (e.g., formed within the lower portion 462 of the hitch ball 407). In addition, one or more of the retention protrusions 464a-b is associated with the body portion 460 (e.g., coupled to the body portion 460). The retention protrusions 464a-b can be threadingly engaged with the body portion, press-fit into the body portion 460, welded to body portion 460, etc. Each of the retention openings 463a-b can receive at least one of the retention protrusions 464a-b to secure the hitch ball 407 to the body portion 460. For example, the retention protrusions 464a-b can extend into the respective retention openings 463a-b. The retention openings 463a-b and the retention protrusions 464a-b can be configured to facilitate movement of the hitch ball 407 against the load measurement device 430 in response to the downward force on the hitch ball. For example, an upper clearance between the retention protrusions 464a-b and the retention walls 465a-b of the retention openings 463a-b can be sized equal to or greater than a range of motion of the load measurement device 430 (e.g., maximum movement of the hitch ball 407) in response to a maximum allowable force applied to the hitch ball 407. This can ensure that the retention protrusions 464a-b will not hinder downward movement of the hitch ball 407, which could interfere with a proper measurement of the downward force on the hitch ball 407. The shapes and/or sizes of the retention protrusions 464a-b and the retention openings 463a-b can be of any suitable configuration (e.g., cross-sectional shapes that are circular, oval, elliptical, rectangular, etc.), structure (e.g., a notch, groove, channel, hole, etc.), or dimension. For example, the retention protrusions 464a-b can comprise at least one of a pin, a bolt, a screw, a rod, a shaft, a tab, a flange, or a ball. In addition, the retention openings 463a-b and the retention protrusions 464a-b can be included in any suitable quantity and in any suitable location or pattern.

The retention protrusions 464a-b and retention openings 463a-b can have any suitable relationship with the associated hitch ball 407 and body portion 460. In one aspect, as shown in FIGS. 5A and 5B, at least two of the retention protrusions 464a-b (and/or retention openings 463a-b) can be oriented parallel to one another. In another aspect, one or more of the retention protrusions 464a-b (and/or retention openings 463a-b) can be oriented tangential to an outer periphery of the lower portion. In this case, the retention openings 463a-b can be open on at least one end and a lateral side. In one aspect, as shown in the illustrated example, ends 468a-b of the retention protrusions 464a-b can extend all the way through the hitch ball 407 (e.g., through the retention openings 463a-b and the lower portion 462) and terminate within the body portion 460. In one aspect, as illustrated in FIG. 5B, a retention opening 463 can extend (entirely) about an outer periphery of the lower portion 462. In this case, one or more tangentially located and oriented retention protrusions 464a-d can extend into the (single) retention opening 463. Such a configuration can enable relative rotation between the hitch ball 407 and the body portion 460. The retention opening 463 can be similar to the retention opening 363 of FIGS. 4B-4H discussed above, and therefore the above discussion is also applicable to the retention opening 463.

Figure 5C:
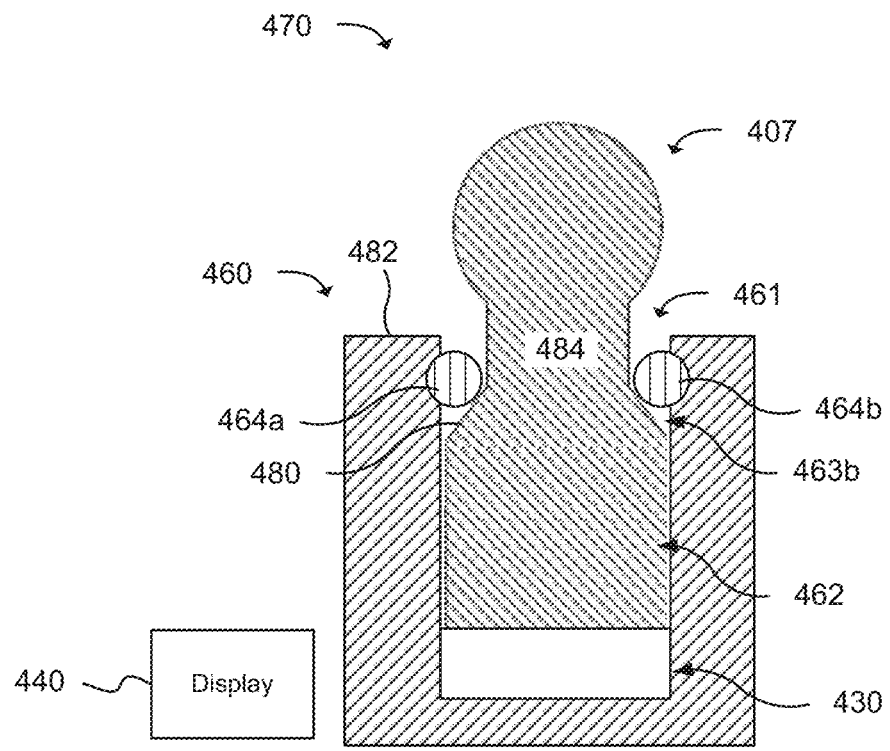
FIGS. 5C and 5D are schematic side cross-section views of a weight measuring hitch ball assembly in accordance with an example of the present disclosure.
Figure 5D:
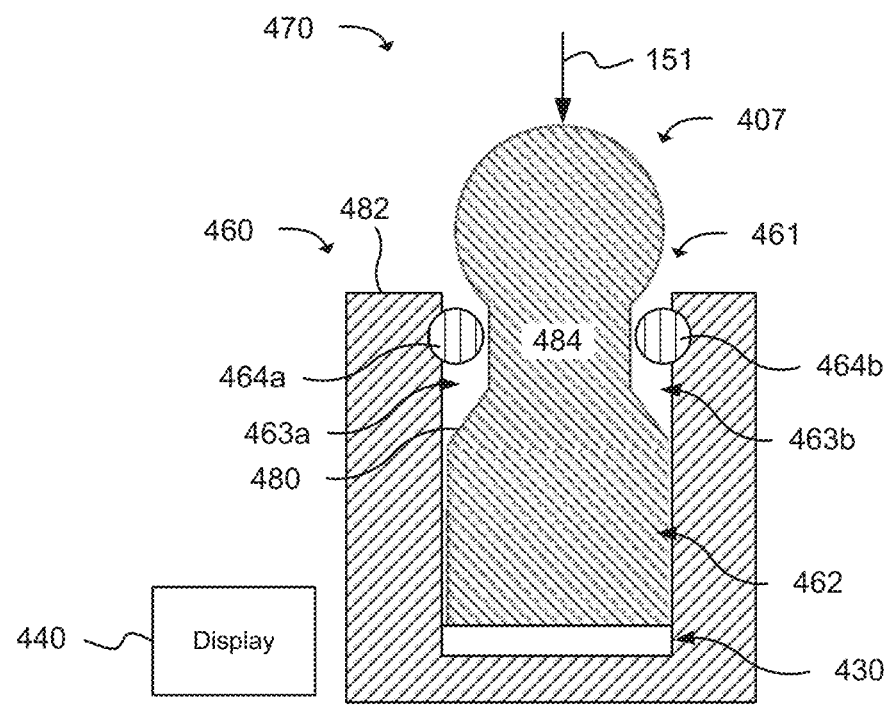

In another aspect, as shown in FIGS. 5C and 5D, the hitch ball opening 461 of the body portion 460 can be sized to have a depth that, when the hitch ball 407 is inserted into the hitch ball opening 461, a top surface 480 of the lower portion 462 of the hitch ball 407 is below a top surface 482 of the body portion 460. When inserted into the hitch ball opening 461, a space between the top surface 480 of the lower portion 462 of the hitch ball 407 and the top surface 482 of the body portion 460 can form or otherwise define the retention opening(s) 463. For example, when inserted into the hitch ball opening 461, a shelf or ridge located below the neck 484 of the hitch ball 407 may sit below the hitch ball opening 461, and the neck 484 of the hitch ball 407 may protrude out of the top of the hitch ball opening 461. One or more through-holes (not shown) can be formed in a top portion of a sidewall of the body portion 460. In some embodiments the through-holes can be formed on opposing sides so that the through-holes are aligned, or substantially aligned with one another, or in some embodiments, at least substantially the same distance from the top surface 482. The position of the through-holes can be placed to enable one or more retention protrusions 464a-b to extend in a horizontal orientation from a first through-hole, through (or at least partially or substantially through) the retention opening 463 to the second through-hole located opposite from the first through-hole. The through-holes can be offset from the center of the hitch ball 407 so that it is positioned adjacent to the neck 484 of the hitch ball 407. In some embodiments, and interior surface of the one or more through-holes or socket (not shown), or an interior surface of the hitch ball opening 461, act as or otherwise define a retention wall that works in connection with retention opening 463 to allow placement and/or positioning of the retention protrusion 464. In other embodiments, the retention protrusion 464a-b can define a retention point, plane, or wall that protrudes into the retention opening 463 and prevents removal of the hitch ball 407 from the hitch ball opening 461. For example, the retention protrusion 464a-b can act as a collar that locks the lower portion 462 of the hitch ball 407 into the body portion 460 of the assembly 401. As shown in FIG. 5D, when a downward force 151 is applied to the hitch ball 407, the retention opening 463a-b vertically expands to match compression of the load measurement device 430. In some embodiments, one through-hole may be used with a corresponding socket which receives the end of the retention protrusion 464 and secures it in a fixed position without allowing an end thereof to extend outside of the body portion 460. In some embodiments, multiple retention protrusions can be used in parallel or in another relationship that is tangential to a circumference of the neck of hitch ball 407. In some embodiments a single retention may be used along with a single set of through-holes, or a through-hole and a socket. A number of specific devices can be used as retention protrusions, such as bolts, pins, screws, bars, beams, rods, etc. Additionally, hardware, such as nuts, cotter pins, etc. can be used to hold the retention protrusions in place. For example, a retention protrusion could be a bold having a head and at least one threaded end which is secured in place by attaching a nut to the threaded end protruding out of the body portion. In other embodiments, the through hole(s) can be configured with retention mechanisms, such as thread, groves, notches, protrusions, etc. that allow the retention protrusions to be locked or secured in place within the through-holes and/or through-hole and socket arrangement. For example, a socket opposite the through-hole can be include threads on its interior that allow a threaded end of a bold to be secured in place by engaging the threads within the socket.

Additionally, in some embodiments, the neck of hitch ball 407 can be sufficiently long so that the ball extends a sufficient distance above the top surface 482 of block 460 that it can engage a trailer tongue and allow operation of the hitch without interference from the block 460. Furthermore, it is to be understood that while the top surface 480 is shown at an obtuse angle with respect to neck 484, such surface can be configured at any suitable angle with respect to neck 484, such as an 80 degree angle, a 90 degree angle, a 100 degree angle, a 110 degree angle, a 120 degree angle, etc. In some embodiments, the angle can be any angle between a 70 degree and 130 degree angle.

Referring generally to FIGS. 5A-5D, in one aspect, ends of the retention protrusions 464a-b can terminate within the retention openings 463, 463a-b (e.g., within the lower portion 462 of the hitch ball 407). In other words, the retention protrusions 464a-b do not extend all the way through the hitch ball 407 (e.g., through the lower portion 462). In a particular aspect, one or more of the retention openings 463a-b can be blind openings or holes (e.g., openings or holes that do not extend all the way through the lower portion 462 of the hitch ball 407). Thus, one or more of the retention openings 463a-b can be blind openings or through openings and the retention protrusions 464a-b may not extend all the way through the hitch ball 407.

Although the retention openings 463, 463a-b have been shown and described as being associated with the hitch ball 407 and the retention protrusions 464a-b have been shown and described as being associated with the body portion 460, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

Figure 6A:
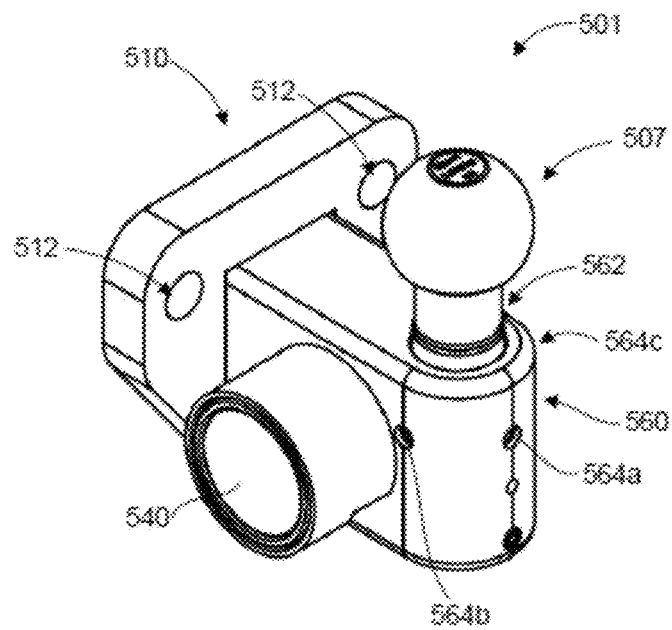
FIGS. 6A and 6B are perspective views of a weight measuring hitch ball assembly in accordance with an example of the present disclosure.
Figure 6B:
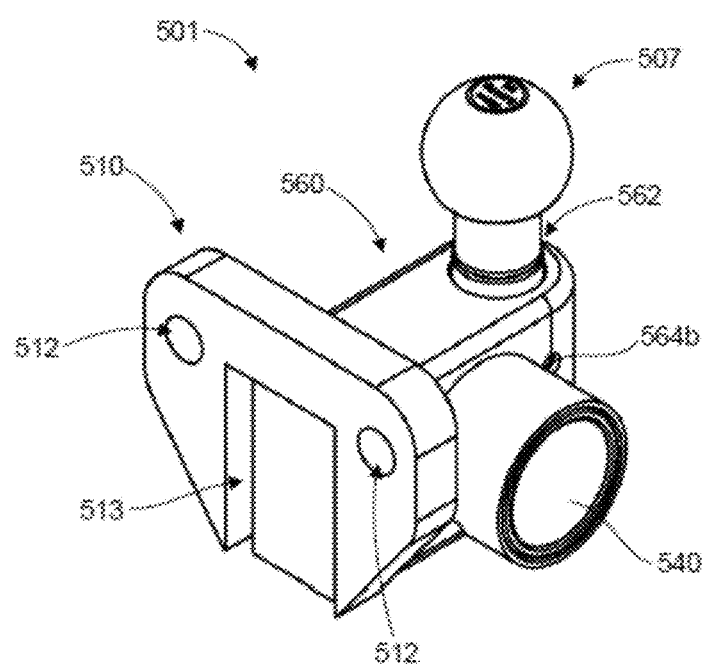
Figure 6C:
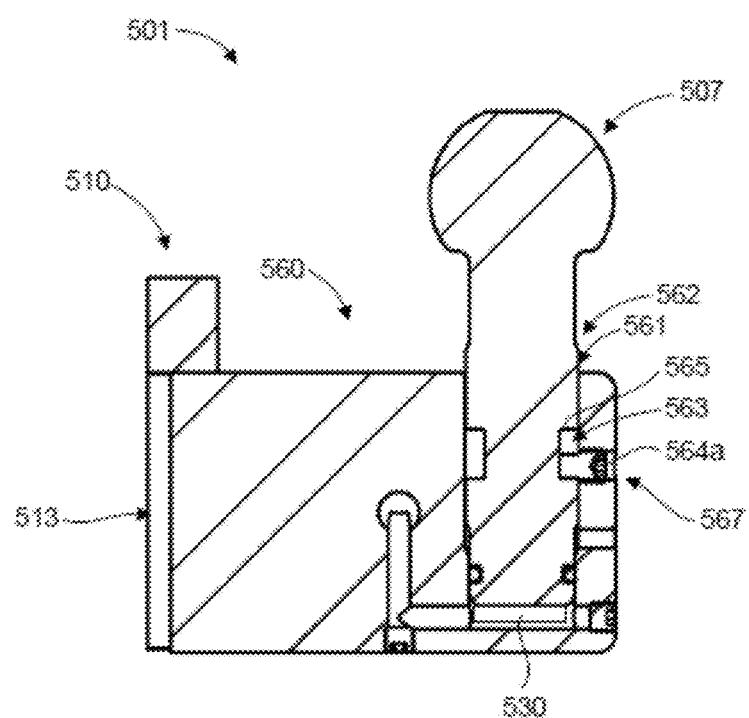
FIG. 6C is a side cross-section view of the weight measuring hitch ball assembly of FIGS. 6A and 6B, in accordance with an example of the present disclosure.
Figure 7A:
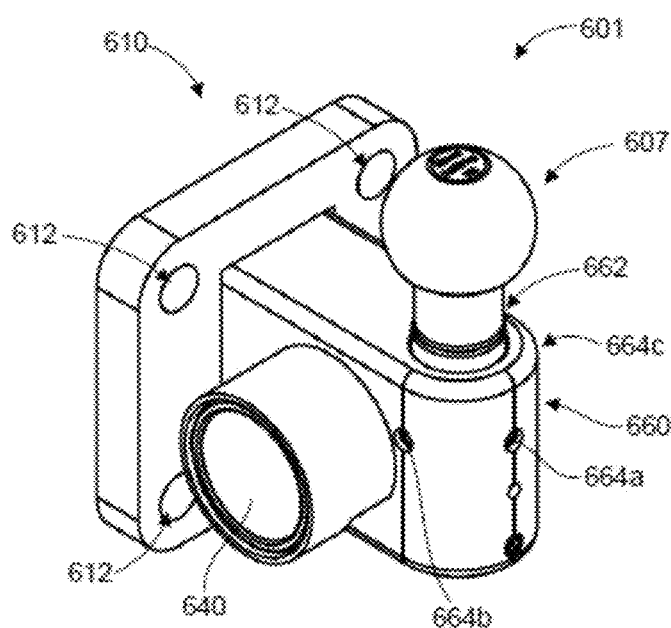
FIGS. 7A and 7B are perspective views of a weight measuring hitch ball assembly in accordance with an example of the present disclosure.
Figure 7B:
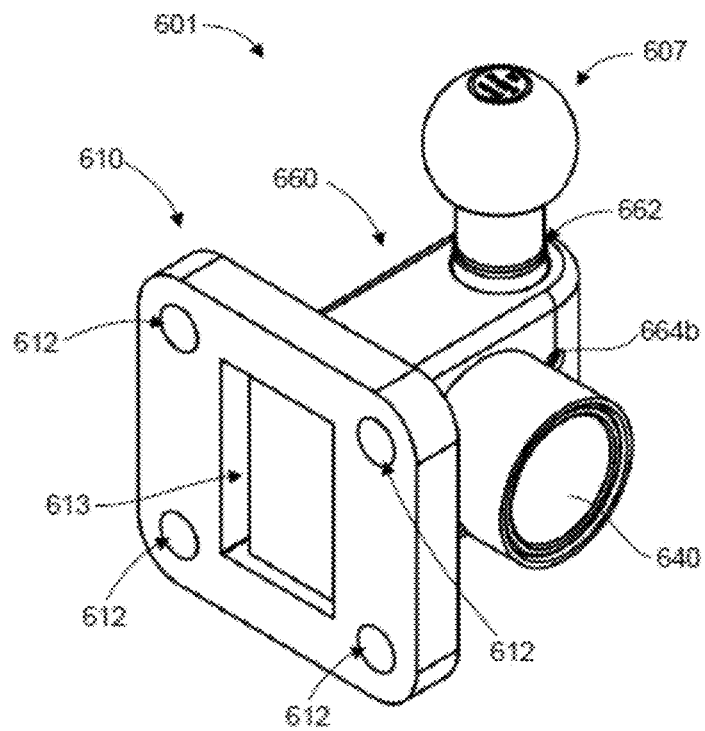
Figure 7C:
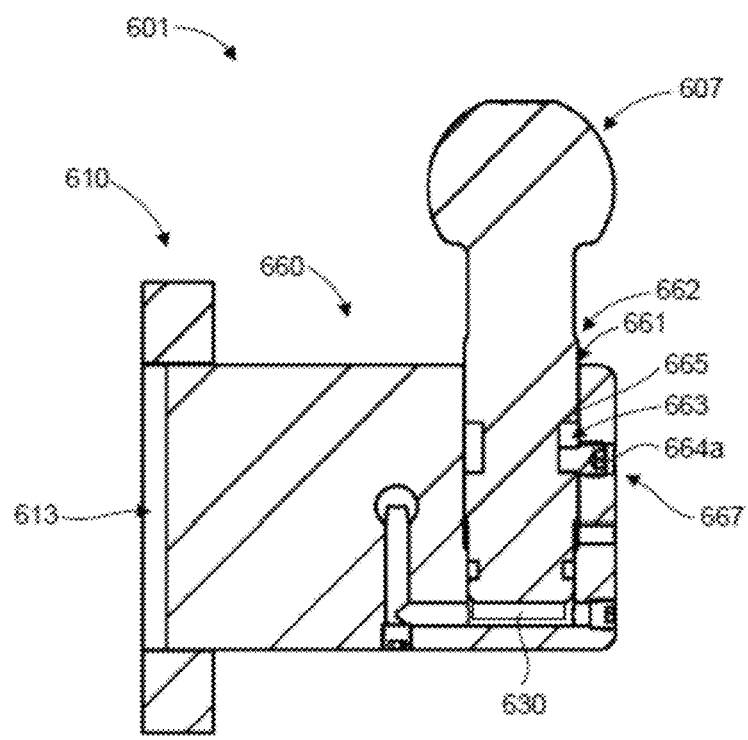
FIG. 7C is a side view of the weight measuring hitch ball assembly of FIGS. 7A and 7B.
Figure 8A:
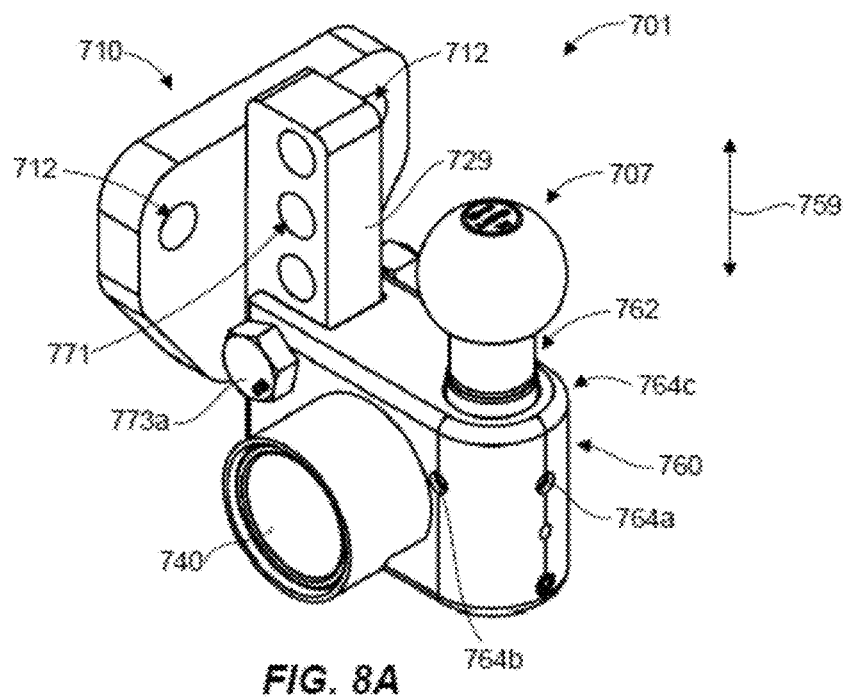
FIGS. 8A and 8B are perspective views of a weight measuring hitch ball assembly in accordance with an example of the present disclosure.
Figure 8B:
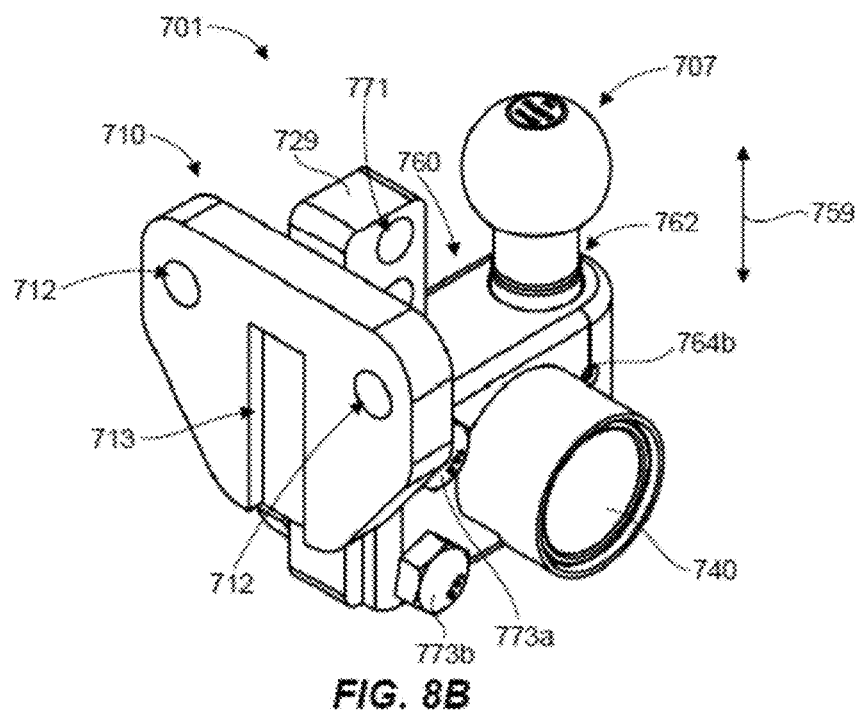
Figure 8C:
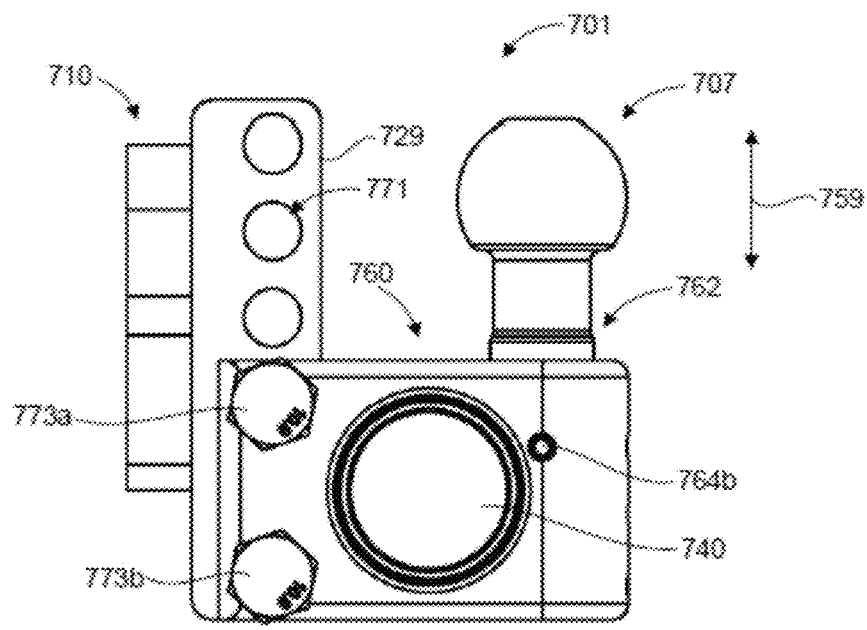
FIG. 8C is a side cross-section view of the weight measuring hitch ball assembly of FIGS. 8A and 8B, in accordance with an example of the present disclosure.
Figure 8D:
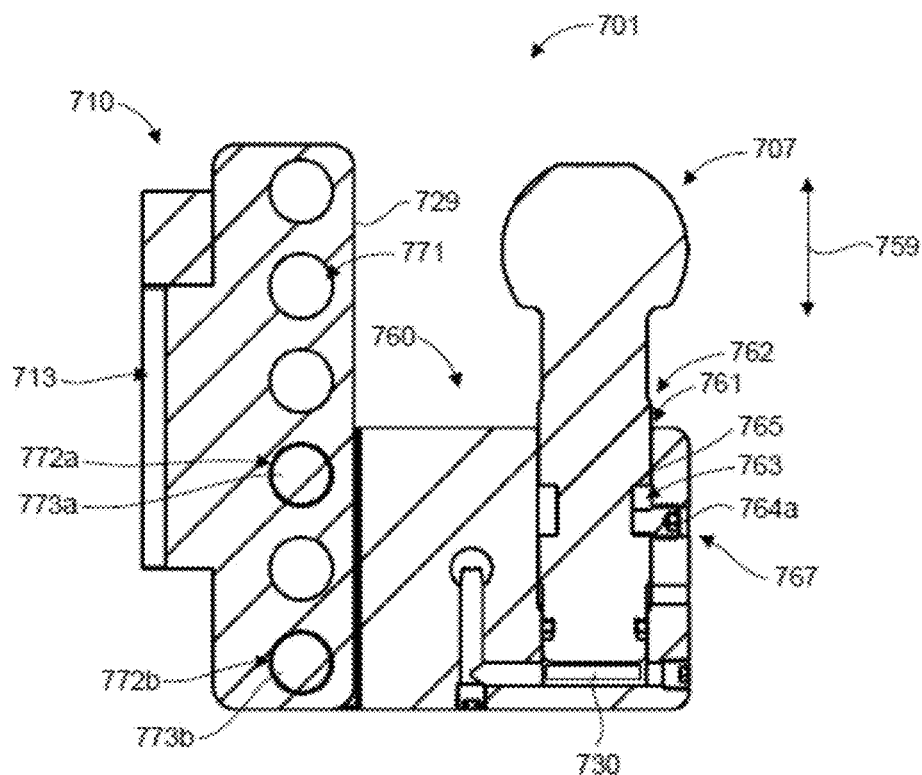
FIG. 8D is a side cross-section view of the weight measuring hitch ball assembly of FIGS. 8A and 8B, in accordance with an example of the present disclosure.
Figure 9A:
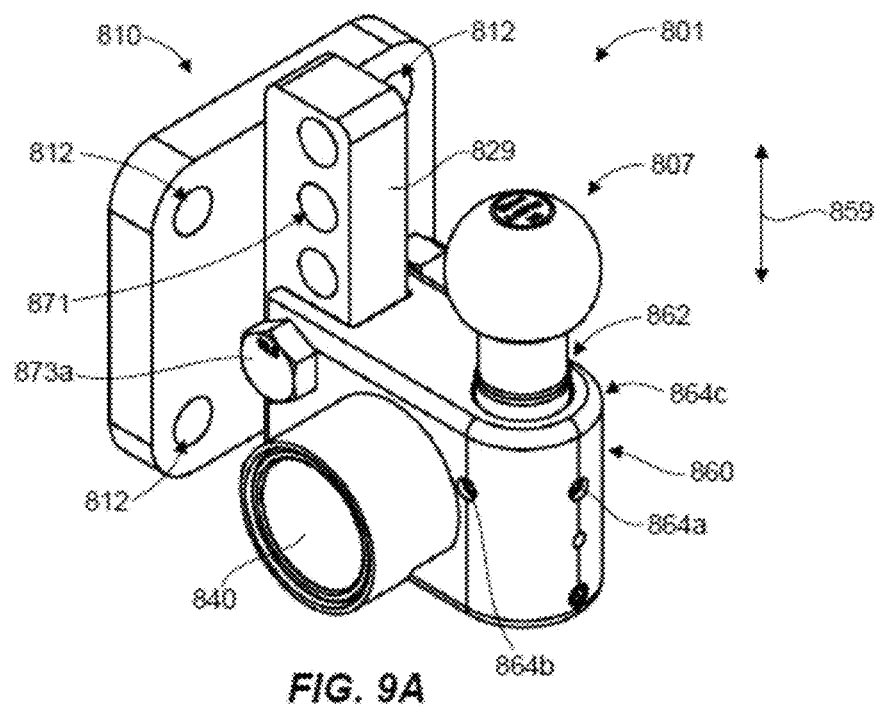
FIGS. 9A and 9B are perspective views of a weight measuring hitch ball assembly in accordance with an example of the present disclosure.
Figure 9B:
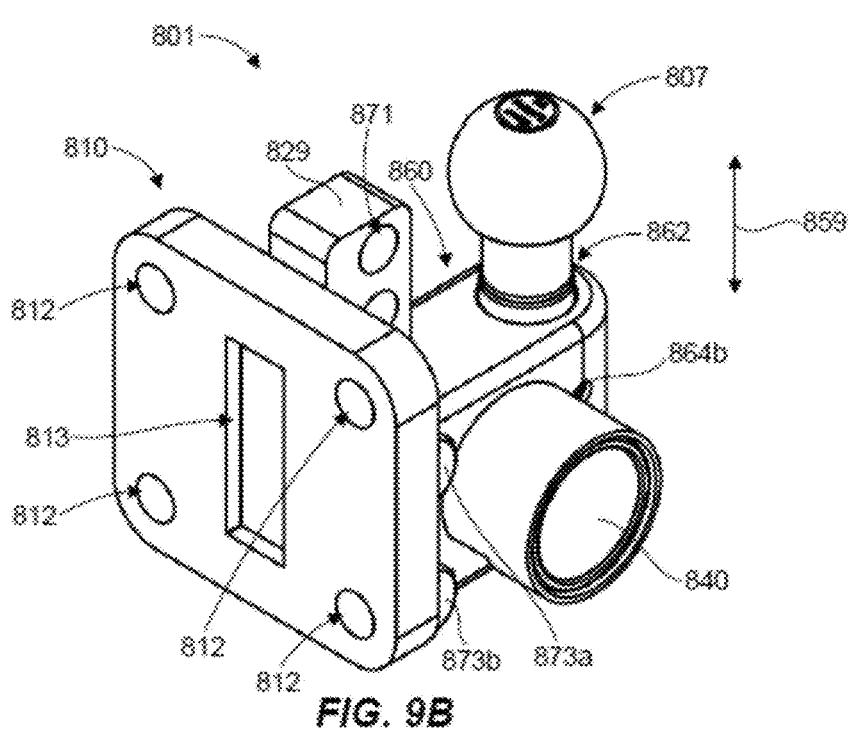
Figure 9C:
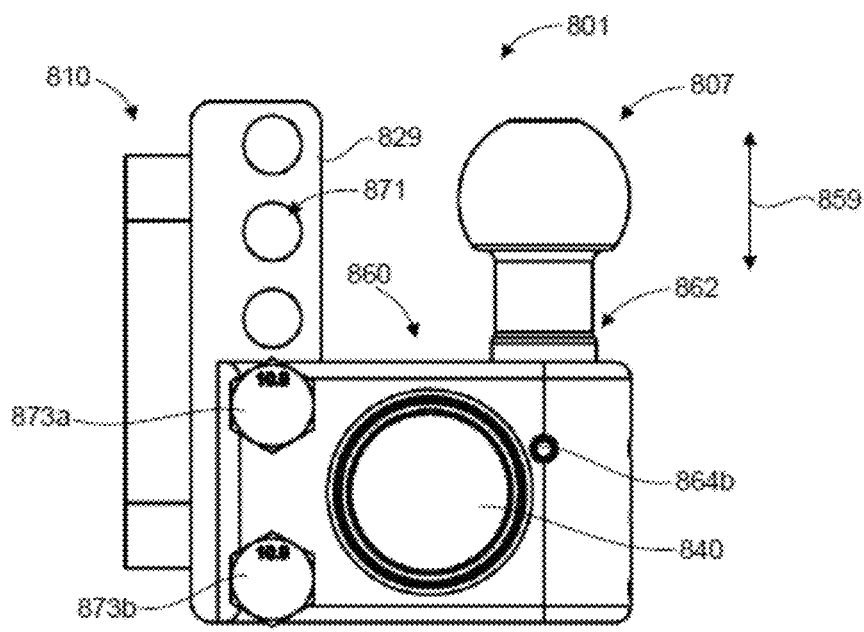
FIG. 9C is a side view of the weight measuring hitch ball assembly of FIGS. 9A and 9B.
Figure 9D:
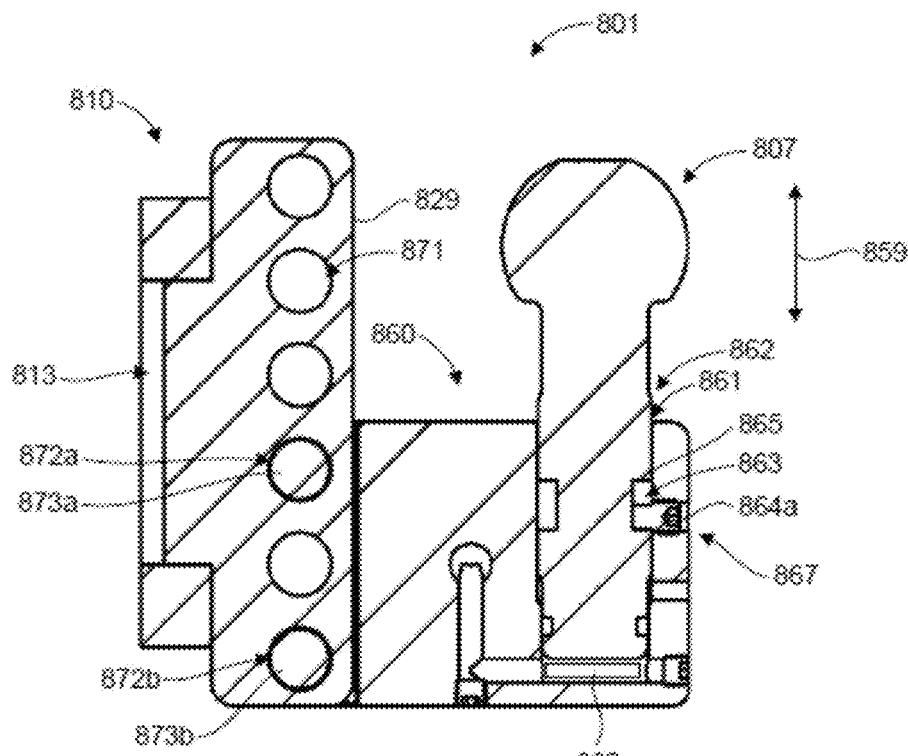
FIG. 9D is a side cross-section view of the weight measuring hitch ball assembly of FIGS. 9A and 9B, in accordance with an example of the present disclosure.

FIGS. 6A-9D illustrate weight measuring hitch ball assemblies 501, 601, 701, 801 in accordance with several examples of the present disclosure. Specifically, the weight measuring hitch ball assembly 501 is shown in FIGS. 6A-6C, the weight measuring hitch ball assembly 601 is shown in FIGS. 7A-7C, the weight measuring hitch ball assembly 701 is shown in FIGS. 8A-8D, and the weight measuring hitch ball assembly 801 is shown in FIGS. 9A-9D. The weight measuring hitch ball assemblies 501, 601, 701, 801 are similar in many respects. Therefore, common elements and features of these assemblies are discussed together for brevity.

As with other weight measuring hitch ball assemblies disclosed herein, the respective weight measuring hitch ball assemblies 501, 601, 701, 801 can include hitch balls 507, 607, 707, 807 configured to engage with a coupling device of the trailer, load measurement devices 530, 630, 730, 830 operable to determine a magnitude of a downward force acting on the hitch balls, and a support structure or body portion 560, 660, 760, 860 in support of the hitch balls. The respective body portions 560, 660, 760, 860 can include or define hitch ball openings or sockets 561, 661, 761, 861 to slidably receive lower portions 562, 662, 762, 862 of the hitch balls. The load measurement devices 530, 630, 730, 830 can comprise any suitable type of load measurement device or mechanism described herein. In one aspect, displays 540, 640, 740, 840 for the respective load measurement devices 530, 630, 730, 830 can be included to indicate the magnitude of the load or downward force acting on the hitch balls. The displays 540, 640, 740, 840 can be of any suitable type or configuration disclosed herein and can be disposed in any suitable location.

In addition, as with other weight measuring hitch ball assemblies disclosed herein, the assemblies 501, 601, 701, 801 can be configured to capture the respective hitch balls 507, 607, 707, 807 to prevent the hitch balls from unwanted separation from the body portions. For example, the respective assemblies 501, 601, 701, 801 can include retention couplings 567, 667, 767, 867 that secure the hitch balls to the body portions while also facilitating slidable movement of the hitch balls within the hitch ball openings of the body portions to determine the magnitude of a force acting on the hitch balls. The respective retention couplings 567, 667, 767, 867 can have retention protrusions 564a-c, 664a-c, 764a-c, 864a-c (the retention protrusions 564c, 664c, 764c, 864c are obscured from view so the reference numbers indicate the locations of the retention protrusions 564c, 664c, 764c, 864c in the figures) and retention walls 565, 665, 765, 865 defining at least a portion of retention openings 563, 663, 763, 863 operable to receive at least a portion of the retention protrusions therein. The retention walls can provide a mechanical barrier to the retention protrusion that prevents removal of the hitch balls from the hitch ball openings.

In the illustrated examples, the retention openings 563, 663, 763, 863 are associated with the hitch balls (e.g., formed within the lower portions of the hitch balls). In addition, the retention protrusions 564a-c, 664a-c, 764a-c, 864a-c are associated with the body portion (e.g., coupled to the body portions). As shown in the illustrated examples, the retention protrusions 564a-c, 664a-c, 764a-c, 864a-c can be threadingly engaged with the body portions. Each of the retention openings 563, 663, 763, 863 can receive at least one retention protrusion to secure the hitch balls to the body portions. For example, the retention protrusions 564a-c, 664a-c, 764a-c, 864a-c can extend into the respective retention openings 563, 663, 763, 863.

The retention openings 563, 663, 763, 863 and the respective retention protrusions 564a-c, 664a-c, 764a-c, 864a-c can be configured to facilitate movement of the hitch balls against the load measurement devices in response to the downward force on the hitch balls (e.g., by providing an upper clearance between the retention protrusions and the retention walls of the retention openings) and ensure that the retention protrusions will not hinder downward movement of the hitch balls. The shape and/or size of the retention openings can be of any suitable configuration (e.g., cross-sectional shape that is circular, oval, elliptical, rectangular, etc.), structure (e.g., a notch, groove, channel, hole, etc.), or dimension. The shapes and/or sizes of the retention protrusions can also be of any suitable configuration (e.g., cross-sectional shapes that are circular, oval, elliptical, rectangular, etc.), structure (e.g., a notch, groove, channel, hole, etc.), or dimension. For example, the retention protrusions can comprise at least one of a pin, a bolt, a screw, a rod, a shaft, a tab, a flange, or a ball.

Although any suitable number of retention protrusions and retention openings can be utilized and arranged in accordance with the principles disclosed herein, the retention openings 563, 663, 763, 863 can each be a single retention opening configured similar to the retention opening 363 of FIGS. 4C-4H, which extends (entirely) about an outer periphery of the lower portion of the hitch ball. Additionally, the retention couplings 567, 667, 767, 867 are each illustrated with three retention protrusions arranged similar to the retention protrusions 364a-c shown in FIG. 4E, which extends into the (single) retention opening. This configuration can enable relative rotation between the hitch balls and the body portions about longitudinal or vertical axes of the hitch balls.

Although the retention openings 563, 663, 763, 863 have been shown and described as being associated with the respective hitch balls 507, 607, 707, 807 and the retention protrusions 564a-c, 664a-c, 764a-c, 864a-c have been shown and described as being associated with the body portions, it should be recognized that retention openings and retention protrusions can be associated with a hitch ball and/or a body portion, in any suitable arrangement or combination, as desired. For example, retention openings can be associated with a body portion, and retention protrusions can be associated with a hitch ball (e.g., coupled to the hitch ball, such as threadingly engaged with the hitch ball). In another example, retention openings and retention protrusions can be associated with both a hitch ball and a body portion.

In general, the weight measuring hitch ball assemblies 501, 601, 701, 801 can be adapted to couple or interface with any suitable attachment structure, as disclosed herein, to facilitate coupling the assemblies to tow vehicles. For example, the assemblies 501, 601, 701, 801 can include respective hitch portions 510, 610, 710, 810 configured to interface with attachment structures associated with tow vehicles that facilitates coupling the assemblies to the tow vehicles. In the illustrated examples, the hitch portions 510, 610, 710, 810 are configured to interface with "bumper pull" style attachment structures typically used on vehicles in European countries. In this case, the hitch portions 510, 610, 710, 810 can be located laterally (e.g., at front ends) of the respective body portions 560, 660, 760, 860 on lateral or front sides of the hitch balls 507, 607, 707, 807. Each respective hitch portion 510, 610, 710, 810 can include a recess 513, 613, 713, 813 configured to receive a protrusion of the attachment structure, and holes 512, 612, 712, 812 or other suitable feature to facilitate securing the assemblies to the attachment structure, such as with threaded fasteners (e.g., bolts or studs) extending through the holes of the assembly and holes of the attachment structure. The hitch portions 510, 710 of FIGS. 6A-6C and FIGS. 8A-8D, respectively, each include two holes 512, 712 and are configured to interface with and secure to "two hole" style attachment features common in European countries. The hitch portions 510, 710 of FIGS. 7A-6C and FIGS. 9A-9D, respectively, each include four holes 612, 812 and are configured to interface with and secure to "four hole" style attachment features common in European countries.

In one aspect, the weight measuring hitch ball assemblies 701, 801 can include features and structures that facilitate vertical height adjustments of the hitch balls 707, 807. These features can be used, for example, to position the hitch balls 707, 807 at a suitable height for engaging a trailer when an attachment structure on the tow vehicle would otherwise be too high.

The respective assemblies 701, 801 can include vertical members 729, 829 coupled between the hitch portions 710, 810 and the body portions 760, 860 configured to allow adjustment of a height of the hitch balls 707, 807 with respect to the hitch portions 710, 810 in directions 759, 859. The assemblies 701, 801 can therefore include multiple separable components in a height-adjustable device. The height of the hitch balls 707, 807 can be adjustable with respect to the hitch portions 710, 810 utilizing respective height adjustment mechanisms 770, 870. The height adjustment mechanisms 770, 870 can include respective height adjustment openings 771, 871 in the vertical members 729, 829. The height adjustment mechanisms 770, 870 can also include two or more height adjustment pin openings 772a-b, 872a-b in the respective body portions 760, 860. In addition, the height adjustment mechanisms 770, 870 can include two or more height adjustment pins 773a-b, 873a-b removably extendable at least partially through the respective height adjustment pin openings 772a-b, 872a-b in the body portions 760, 860 and the height adjustment openings 771, 871 in the vertical members 729, 829. The height adjustment pins 773a-b, 873a-b can have any suitable configuration known in the art, such as a pin, a bolt, a screw, a rod, a shaft, etc.

In one aspect, the body portions 760, 860 can be configured to interface with the respective vertical members 729, 829. For example, the vertical members 729, 829 and the respective body portions 760, 860 can be configured with complementary geometries to facilitate a stable engagement of the vertical members 729, 829 and the body portions 760, 860 when coupled to one another via the height adjustment pins 773a-b, 873a-b, as discussed above. For example, the vertical members 729, 829 can have a rectangular shaped cross-section and the respective body portions 760, 860 can have a similar rectangular shaped opening to mate with and engage at least a portion of the rectangular shaped cross-section of the vertical members 729, 829. Such an interface configuration can provide torsional stability for mating vertical members 729, 829 and body portion 760, 860 components of the respective assemblies 701, 801.

In use, the height adjustment pins 773a-b, 873a-b can be removed from at least the height adjustment openings 771, 871 in the respective vertical members 729, 829, and the body portions 760, 860 can be moved vertically in directions 759, 859. Once a desired height of the hitch balls 707, 807 is achieved, the height adjustment pins 773a-b, 873a-b can be inserted into the nearest acceptable height adjustment openings 771, 871 through the respective height adjustment pin openings 772a-b, 872a-b to fix the relative position of the body portions 760, 860 and the vertical members 729, 829 and complete the height adjustment of the hitch balls 707, 807.

The following illustrates a method of using the hitch ball assembly. Referring to FIG. 2, one example of a method for securing a hitch ball 107 in a body portion 160 of a weight measuring hitch ball assembly 101 can include inserting a lower portion 162 of the hitch ball 107 into a hitch ball opening 161 that slidably receives the lower portion 162 of the hitch ball 107. Inserting the lower portion 162 of the hitch ball 107 into the hitch ball opening 161 places the hitch ball 107 in proximity to a load measurement device 130 used to determine a magnitude of a force acting 151 on the hitch ball 107.

The hitch ball 107 can be secured to the body portion 160 using a retention coupling 167 that is operable with the hitch ball 107 and the body portion 160. The retention coupling 167 can include one or more retention protrusions 164a-b and one or more retention walls 165a-b defining at least a portion of a retention opening 163a-b operable to receive at least a portion of a retention protrusion 164a-b therein.

In one example, as shown in FIG. 3, securing the hitch ball 207 to the body portion 260 includes inserting the retention protrusion 264a-b through the retention opening 263a-b in a sidewall of the body portion 260 so that an end portion of the retention protrusion 264a-b terminates within a recess or blind opening about the lower portion 262 of the hitch ball 207. In another example, as shown in FIGS. 5A-5D, securing the hitch ball 407 to the body portion 460 includes inserting the retention protrusion 464a-b through the retention opening 463a-b in a sidewall of the body portion 460, such that the retention protrusion 464a-b extends through the retention opening 463a-b in the hitch ball opening 461, and an end portion 468a-b of the retention protrusion 464a-b terminates within the retention opening 461 in an opposing side of the sidewall of the body portion 460.

In one aspect, shown in FIG. 3, the retention protrusion 264a-b can be threadingly engaged to the retention opening 263a-b in a sidewall of the body portion 260. The retention opening 263a-b formed in the lower portion 262 of the hitch ball 207 can be configured to allow vertical movement of the retention protrusion 264a-b within the retention opening 263a-b in the lower portion 262 of the hitch ball 207 sufficient to determine the magnitude of the force acting on the hitch ball 207. Referring to FIG. 2, in another aspect, a retention protrusion 164a-b can be threadingly engaged to a blind opening (not shown) in the lower portion 162 of the hitch ball 107. A through-hole formed in the sidewall of the body portion 160 can be configured (e.g., a groove or channel) to allow vertical movement of the retention protrusion 164a-b within the through-hole sufficient to determine a magnitude of the force 151 acting on the hitch ball 107.

With continuing reference to FIG. 2, with a retention protrusion 164a-b extending into a retention opening 163a-b, a retention wall 165a-b provides a mechanical barrier to the retention protrusion 164a-b that prevents removal of the hitch ball 107 from the hitch ball opening 161. Furthermore, the retention opening 161 facilitates slidable movement of the hitch ball 107 within the hitch ball opening 161 sufficient to determine a magnitude of force 161 acting on the hitch ball 107 via the load measurement device 130. Having secured the hitch ball 107 in the body portion 160 of the hitch ball assembly 102, a load can be applied to the hitch ball 107, which causes slidable movement of the hitch ball 107 within the hitch ball opening 161. The retention coupling 167 allows vertical movement of the lower portion 162 of the hitch ball 107 to engage the load measurement device 130. Thereafter, a determination of magnitude of force 151 acting on the hitch ball 107 can be made by referencing an indication of force in the display 140 of the load measurement device 130.

EXAMPLES

The following examples pertain to specific invention embodiments and point out specific features, elements, or steps that can be used or otherwise combined in achieving such embodiments.

In one example there is provided, a weight measuring hitch ball assembly, comprising:
- a hitch ball having a ball and a lower portion; a body portion defining a hitch ball opening that slidably receives the lower portion of the hitch ball;
- a load measurement device operably associated with the body portion and the hitch ball to determine a magnitude of a force acting on the hitch ball; and
- a retention coupling operable with the hitch ball and the body portion to secure the hitch ball to the body portion, the retention coupling having a retention protrusion and a retention wall defining at least a portion of a retention opening operable to receive at least a portion of the retention protrusion therein, the retention opening being associated with an outer periphery of the lower portion of the hitch ball,
- wherein, with the retention protrusion extending into the retention opening, the retention wall provides a mechanical barrier to the retention protrusion that prevents removal of the hitch ball from the hitch ball opening, and
- wherein either the lower portion of the hitch ball, or the retention opening, is configured to facilitate slidable movement of the hitch ball within the hitch ball opening sufficient to determine the magnitude of the force acting on the hitch ball.

In one example of the weight measuring hitch ball assembly, the retention opening in the lower portion of the hitch ball is sized to be equal to or greater than a range of motion of a load measurement device in response to a maximum allowable force applied to the hitch ball.

In one example of the weight measuring hitch ball assembly, the retention opening in the body portion is sized to be equal to or greater than a range of motion of a load measurement device in response to a maximum allowable force applied to the hitch ball.

In one example of the weight measuring hitch ball assembly, the retention opening extends about an outer periphery of the lower portion of the hitch ball forming a recess about a longitudinal or vertical axis of the hitch ball that provides the mechanical barrier to the retention protrusion.

In one example of the weight measuring hitch ball assembly, the retention opening comprises at least one blind opening in an outer periphery of the lower portion of the hitch ball to receive at least the portion of the retention protrusion when aligned with the retention protrusion.

In one example of the weight measuring hitch ball assembly, the retention opening further comprises a through-hole formed in a sidewall of the body portion to receive the retention protrusion and allow an end portion of the retention protrusion to terminate within a recess or blind opening about the lower portion of the hitch ball.

In one example of the weight measuring hitch ball assembly, the retention protrusion is threadingly engaged with the through-hole of the body portion, and the retention opening formed in the lower portion of the hitch ball is configured to allow vertical movement of the retention protrusion within the retention opening in the lower portion of the hitch ball sufficient determine the magnitude of the force acting on the hitch ball.

In one example of the weight measuring hitch ball assembly, the retention protrusion is threadingly engaged with the lower portion of the hitch ball, and the through-hole formed in the sidewall of the body is configured to allow vertical movement of the retention protrusion within the through-hole sufficient to determine the magnitude of the force acting on the hitch ball.

In one example of the weight measuring hitch ball assembly, the retention opening and the retention protrusion are oriented toward a center of the lower portion of the hitch ball.

In one example of the weight measuring hitch ball assembly, the retention coupling further comprises at least two retention openings in a sidewall of the body portion that receive retention protrusions that are aligned with one another.

In one example of the weight measuring hitch ball assembly, the retention coupling further comprises at least two retention openings in a sidewall of the body portion that receive retention protrusions that are oriented parallel to one another.

In one example of the weight measuring hitch ball assembly, the retention coupling further comprises at least two retention openings in a sidewall of the body portion that receive retention protrusions that are oriented tangential to an outer periphery of the lower portion.

In one example of the weight measuring hitch ball assembly, the hitch ball opening of the body portion is sized to have a depth that places a top surface of the lower portion of the hitch ball below a top surface of the body portion, thereby forming the retention opening to be a space between the top surface of the lower portion of the hitch ball and the top surface of the body portion.

In one example of the weight measuring hitch ball assembly, the retention opening further comprises a first and second through-hole formed in a top portion of a sidewall of the body portion, the first and second through-holes being located on opposing sides of the body portion, and the first and second through-holes being aligned to enable the retention protrusion to extend from the first through-hole through the hitch ball opening to the second through-hole, thereby defining the retention wall that prevents removal of the hitch ball from the hitch ball opening.

In one example of the weight measuring hitch ball assembly, the first and second through-holes in the sidewall of the body portion are offset a distance from a center of the hitch ball that avoids a neck of the hitch ball from obstructing the retention protrusion.

In one example, there is provided a method for securing a hitch ball in a body portion of a weight measuring hitch ball assembly, comprising:
   inserting a lower portion of the hitch ball into a hitch ball opening that slidably receives the lower portion of the hitch ball, wherein inserting the lower portion of the hitch ball into the hitch ball opening places the hitch ball in proximity to a load measurement device to determine a magnitude of a force acting on the hitch ball; and
   securing the hitch ball to the body portion using a retention coupling operable with the hitch ball and the body portion, the retention coupling having a retention protrusion and a retention wall defining at least a portion of a retention opening operable to receive at least a portion of the retention protrusion therein, the retention opening being associated with an outer periphery of the lower portion of the hitch ball,
   wherein, with the retention protrusion extending into the retention opening, the retention wall provides a mechanical barrier to the retention protrusion that prevents removal of the hitch ball from the hitch ball opening, and
   wherein either the lower portion of the hitch ball, or the retention opening, is configured to facilitate slidable movement of the hitch ball within the hitch ball opening sufficient to determine the magnitude of the force acting on the hitch ball.

In one example of the method for securing a hitch ball in a body portion of a weight measuring hitch ball assembly, securing the hitch ball to the body portion further comprises inserting the retention protrusion through the retention opening in a sidewall of the body portion so that an end portion of the retention protrusion terminates within a recess or blind opening about the lower portion of the hitch ball.

In one example of the method for securing a hitch ball in a body portion of a weight measuring hitch ball assembly, securing the hitch ball to the body portion further comprises inserting the retention protrusion through the retention opening in a sidewall of the body portion, the retention protrusion extending through the retention opening in the hitch ball opening, and an end portion of the retention protrusion terminates within the retention opening in an opposing side of the sidewall of the body portion.

In one example of the method for securing a hitch ball in a body portion of a weight measuring hitch ball assembly, securing the hitch ball to the body portion further comprises:
   threadingly engaging the retention protrusion to the retention opening in a sidewall of body portion, wherein the retention opening formed in the lower portion of the hitch ball is configured to allow vertical movement of the retention protrusion within the retention opening in the lower portion of the hitch ball sufficient determine the magnitude of the force acting on the hitch ball.

In one example of the method for securing a hitch ball in a body portion of a weight measuring hitch ball assembly, securing the hitch ball to the body portion further comprises:
   threadingly engaging the retention protrusion to a blind opening in the lower portion of the hitch ball, wherein a through-hole formed in the sidewall of the body portion is configured to allow vertical movement of the retention protrusion within the through-hole sufficient to determine the magnitude of the force acting on the hitch ball.

In one example of the method for securing a hitch ball in a body portion of a weight measuring hitch ball assembly, the method further comprises:

applying a load to the hitch ball that causes slidable movement of the hitch ball within the hitch ball opening, the retention coupling allowing vertical movement of the lower portion of the hitch ball to engage the load measurement device; and determining the magnitude of the force acting on the hitch ball indicated by the load measurement device.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A weight measuring hitch ball assembly, comprising:
a hitch ball having a ball and a lower portion;
a body portion defining a hitch ball opening that slidably receives the lower portion of the hitch ball;
a load measurement device operably associated with the body portion and the hitch ball to determine a magnitude of a force acting on the hitch ball; and
a retention coupling operable with the hitch ball and the body portion to secure the hitch ball to the body portion, the retention coupling having a retention protrusion and a retention wall defining at least a portion of a retention opening operable to receive at least a portion of the retention protrusion therein, the retention opening being associated with an outer periphery of the lower portion of the hitch ball, wherein the retention protrusion does not extend all the way through the hitch ball,
wherein, with the retention protrusion extending into the retention opening, the retention wall provides a mechanical barrier to the retention protrusion that prevents removal of the hitch ball from the hitch ball opening, and
wherein either the lower portion of the hitch ball, or the retention opening, is configured to facilitate slidable movement of the hitch ball within the hitch ball opening sufficient to determine the magnitude of the force acting on the hitch ball.

2. The weight measuring hitch ball assembly in claim 1, wherein the retention opening in the lower portion of the hitch ball is sized to be equal to or greater than a range of motion of a load measurement device in response to a maximum allowable force applied to the hitch ball.

3. The weight measuring hitch ball assembly in claim 1, wherein the retention opening in the body portion is sized to be equal to or greater than a range of motion of a load measurement device in response to a maximum allowable force applied to the hitch ball.

4. The weight measuring hitch ball assembly in claim 1, wherein the retention opening extends about an outer periphery of the lower portion of the hitch ball forming a recess about a longitudinal or vertical axis of the hitch ball that provides the mechanical barrier to the retention protrusion.

5. The weight measuring hitch ball assembly in claim 1, wherein the retention opening comprises at least one blind opening in an outer periphery of the lower portion of the hitch ball to receive at least the portion of the retention protrusion when aligned with the retention protrusion.

6. The weight measuring hitch ball assembly in claim 1, wherein the retention opening further comprises a through-hole formed in a sidewall of the body portion to receive the retention protrusion and allow an end portion of the retention protrusion to terminate within a recess or blind opening about the lower portion of the hitch ball.

7. The weight measuring hitch ball assembly in claim 6, wherein the retention protrusion is threadingly engaged with the through-hole of the body portion, and the retention opening formed in the lower portion of the hitch ball is configured to allow vertical movement of the retention protrusion within the retention opening in the lower portion of the hitch ball sufficient determine the magnitude of the force acting on the hitch ball.

8. The weight measuring hitch ball assembly in claim 6, wherein the retention protrusion is threadingly engaged with the lower portion of the hitch ball, and the through-hole formed in the sidewall of the body is configured to allow vertical movement of the retention protrusion within the through-hole sufficient to determine the magnitude of the force acting on the hitch ball.

9. The weight measuring hitch ball assembly in claim 1, wherein the retention opening and the retention protrusion are oriented toward a center of the lower portion of the hitch ball.

10. The weight measuring hitch ball assembly in claim 1, wherein the retention coupling further comprises at least two retention openings in a sidewall of the body portion that receive retention protrusions that are aligned with one another.

11. The weight measuring hitch ball assembly in claim 1, wherein the retention coupling further comprises at least two retention openings in a sidewall of the body portion that receive retention protrusions that are oriented parallel to one another.

12. The weight measuring hitch ball assembly in claim 1, wherein the retention coupling further comprises at least two retention openings in a sidewall of the body portion that receive retention protrusions that are oriented tangential to an outer periphery of the lower portion.

13. The weight measuring hitch ball assembly in claim 1, wherein the hitch ball opening of the body portion is sized to have a depth that places a top surface of the lower portion of the hitch ball below a top surface of the body portion, thereby forming the retention opening to be a space between the top surface of the lower portion of the hitch ball and the top surface of the body portion.

14. The weight measuring hitch ball assembly in claim 11, wherein the retention opening further comprises a first and second through-hole formed in a top portion of a sidewall of the body portion, the first and second through-holes being located on opposing sides of the body portion, and the first and second through-holes being aligned to enable the retention protrusion to extend from the first through-hole through the hitch ball opening to the second through-hole, thereby defining the retention wall that prevents removal of the hitch ball from the hitch ball opening.

15. The weight measuring hitch ball assembly in claim 11, wherein the first and second through-holes in the sidewall of the body portion are offset a distance from a center of the hitch ball that avoids a neck of the hitch ball from obstructing the retention protrusion.

16. The weight measuring hitch ball assembly in claim 1, wherein the retention protrusion is one of: a pin, a bolt, a screw, a rod, a shaft, a tab, a flange, or a ball.

17. A method for securing a hitch ball in a body portion of a weight measuring hitch ball assembly, comprising:
- inserting a lower portion of the hitch ball into a hitch ball opening that slidably receives the lower portion of the hitch ball, wherein inserting the lower portion of the hitch ball into the hitch ball opening places the hitch ball in proximity to a load measurement device to determine a magnitude of a force acting on the hitch ball; and
- securing the hitch ball to the body portion using a retention coupling operable with the hitch ball and the body portion, the retention coupling having a retention protrusion and a retention wall defining at least a portion of a retention opening operable to receive at least a portion of the retention protrusion therein, the retention opening being associated with an outer periphery of the lower portion of the hitch ball, wherein the retention protrusion does not extend all the way through the hitch ball,
- wherein, with the retention protrusion extending into the retention opening, the retention wall provides a mechanical barrier to the retention protrusion that prevents removal of the hitch ball from the hitch ball opening, and
- wherein either the lower portion of the hitch ball, or the retention opening, is configured to facilitate slidable movement of the hitch ball within the hitch ball opening sufficient to determine the magnitude of the force acting on the hitch ball.

18. The method in claim 17, wherein securing the hitch ball to the body portion further comprises inserting the retention protrusion through the retention opening in a sidewall of the body portion so that an end portion of the retention protrusion terminates within a recess or blind opening about the lower portion of the hitch ball.

19. The method in claim 17, wherein securing the hitch ball to the body portion further comprises inserting the retention protrusion through the retention opening in a sidewall of the body portion, the retention protrusion extending through the retention opening in the hitch ball opening, and an end portion of the retention protrusion terminates within the retention opening in an opposing side of the sidewall of the body portion.

20. The method in claim 17, wherein securing the hitch ball to the body portion further comprises:
- threadingly engaging the retention protrusion to the retention opening in a sidewall of the body portion,
- wherein the retention opening formed in the lower portion of the hitch ball is configured to allow vertical movement of the retention protrusion within the retention opening in the lower portion of the hitch ball sufficient to determine the magnitude of the force acting on the hitch ball.

21. The method in claim 17, wherein securing the hitch ball to the body portion further comprises:
- threadingly engaging the retention protrusion to a blind opening in the lower portion of the hitch ball,
- wherein a through-hole formed in the sidewall of the body portion is configured to allow vertical movement of the retention protrusion within the through-hole sufficient to determine the magnitude of the force acting on the hitch ball.

22. The method in claim 17, further comprising:
- applying a load to the hitch ball that causes slidable movement of the hitch ball within the hitch ball opening, the retention coupling allowing vertical movement of the lower portion of the hitch ball to engage the load measurement device; and
- determining the magnitude of the force acting on the hitch ball indicated by the load measurement device.

* * * * *